(12) United States Patent
Terashita et al.

(10) Patent No.: US 11,175,538 B2
(45) Date of Patent: Nov. 16, 2021

(54) LIQUID CRYSTAL DISPLAY PANEL AND METHOD FOR MANUFACTURING LIQUID CRYSTAL DISPLAY PANEL

(71) Applicant: Sharp Kabushiki Kaisha, Sakai (JP)

(72) Inventors: Shinichi Terashita, Sakai (JP); Kouichi Watanabe, Sakai (JP); Fumikazu Shimoshikiryoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/640,768

(22) PCT Filed: Aug. 15, 2018

(86) PCT No.: PCT/JP2018/030319
§ 371 (c)(1),
(2) Date: Feb. 21, 2020

(87) PCT Pub. No.: WO2019/039358
PCT Pub. Date: Feb. 28, 2019

(65) Prior Publication Data
US 2020/0225541 A1    Jul. 16, 2020

(30) Foreign Application Priority Data
Aug. 22, 2017 (JP) .............................. JP2017-159769

(51) Int. Cl.
  *G02F 1/1337* (2006.01)
  *G02F 1/1343* (2006.01)
  *G02F 1/137* (2006.01)

(52) U.S. Cl.
  CPC ........ *G02F 1/133707* (2013.01); *G02F 1/137* (2013.01); *G02F 1/133788* (2013.01);
  (Continued)

(58) Field of Classification Search
  CPC ......... G02F 1/133711; G02F 1/133753; G02F 2001/133757; G02F 1/133788; G02F 1/133707; G02F 1/133757
  See application file for complete search history.

(56) References Cited

U.S. PATENT DOCUMENTS

2009/0002612 A1\*  1/2009  Tamaki ............. G02F 1/133753
                                                                349/117
2009/0284703 A1   11/2009  Shoraku et al.
(Continued)

FOREIGN PATENT DOCUMENTS

JP    2011-085738 A    4/2011
JP    5184618 B2       4/2013
(Continued)

*Primary Examiner* — Mariam Qureshi
(74) *Attorney, Agent, or Firm* — Keating & Bennett, LLP

(57) ABSTRACT

In the liquid crystal display panel, when no voltage is applied to a liquid crystal layer, a first tilt angle of liquid crystal molecules adjacent to a first vertical alignment film with respect to the first vertical alignment film and a second tilt angle of liquid crystal molecules adjacent to a second vertical alignment film with respect to the second vertical alignment film differ from each other. Any one of the first vertical alignment film and the second vertical alignment film is a photo-alignment film subjected to alignment process such that a plurality of domains, the alignment vectors of which differ from each other, are formed in a region of a display unit. The display unit includes the plurality of domains along a first direction of the display unit in a plan view, when a voltage is applied to the liquid crystal layer.

8 Claims, 28 Drawing Sheets

(52) U.S. Cl.
CPC .. *G02F 1/134309* (2013.01); *G02F 1/133742* (2021.01); *G02F 2201/121* (2013.01); *G02F 2201/123* (2013.01)

(56) References Cited

U.S. PATENT DOCUMENTS

| | | | | |
|---|---|---|---|---|
| 2011/0002039 A1* | 1/2011 | Seo | ................. | G02B 5/3083 |
| | | | | 359/485.01 |
| 2015/0015817 A1* | 1/2015 | Okazaki | ............... | G02F 1/0045 |
| | | | | 349/33 |
| 2015/0036073 A1* | 2/2015 | Im | .................... | G02F 1/1333 |
| | | | | 349/48 |
| 2015/0227006 A1* | 8/2015 | Shimada | .......... | G02F 1/133788 |
| | | | | 438/23 |
| 2015/0268515 A1* | 9/2015 | Seo | ................ | G02F 1/133753 |
| | | | | 349/129 |
| 2015/0277166 A1* | 10/2015 | Kim | ............... | G02F 1/133753 |
| | | | | 349/128 |
| 2018/0217443 A1* | 8/2018 | Wang | .............. | G02F 1/133528 |

FOREIGN PATENT DOCUMENTS

| | | |
|---|---|---|
| JP | 2015-031961 A | 2/2015 |
| WO | 2017/047532 A1 | 3/2017 |

* cited by examiner

CF SUBSTRATE

| FIRST TIME | SECOND TIME | THIRD TIME | FOURTH TIME | SYNTHESIS |
|---|---|---|---|---|
| 10a ↘ 254 | 10a | 10a | 10a | 10a ↘ |
| 10b | 10b ↖ 254 | 10b | 10b | 10b ↖ |
| 10c | 10c | 10c ↙ | 10c | 10c ↙ |
| 10d | 10d | 10d  254 | 10d ↗ 254 | 10d ↗ |

FIG. 14

TFT SUBSTRATE

| FIRST TIME | SECOND TIME | THIRD TIME | FOURTH TIME | SYNTHESIS |
|---|---|---|---|---|
| 10a — [253 ↗] | 10a — | 10a — | 10a — | 10a — ↗ |
| 10b — | 10b — [253 ↘] | 10b — | 10b — | 10b — ↘ |
| 10c — | 10c — | 10c — [↖] | 10c — | 10c — ↖ |
| 10d — | 10d — | 10d — | 10d — [↙ 253] | 10d — ↙ |

FIG. 17

(a) TFT SUBSTRATE

| FIRST TIME | SECOND TIME | THIRD TIME | FOURTH TIME | SYNTHESIS |
|---|---|---|---|---|
| 10a ↗ 253 | 10a | 10a | 10a | 10a ↗ |
| 10b | 10b ↘ 253 | 10b | 10b | 10b ↙ |
| 10c | 10c | 10c ↙ | 10c | 10c ↙ |
| 10d | 10d | 10d | 10d ↙ | 10d ↙ |

(b) CF SUBSTRATE

| FIRST TIME | SECOND TIME | THIRD TIME | FOURTH TIME | SYNTHESIS |
|---|---|---|---|---|
| 10a ↘ 254 | 10a | 10a | 10a | 10a ↘ |
| 10b | 10b ↙ 254 | 10b | 10b | 10b ↖ |
| 10c | 10c | 10c ↙ | 10c | 10c ↙ |
| 10d | 10d | 10d | 10d ↖ | 10d ↗ |

LIQUID CRYSTAL DISPLAY PANEL AND METHOD FOR MANUFACTURING LIQUID CRYSTAL DISPLAY PANEL

TECHNICAL FIELD

The disclosure relates to a liquid crystal display panel and a method for manufacturing the liquid crystal display panel. More specifically, the disclosure relates to a liquid crystal display panel having a configuration of dividing one pixel into a plurality of alignment regions (domains) and a method for manufacturing the liquid crystal display panel, which is suitable for manufacturing of the liquid crystal display panel.

BACKGROUND ART

A liquid crystal display device is a display device that uses a liquid crystal composition to perform display. In its representative display system, a liquid crystal display panel in which the liquid crystal composition is encapsulated between a first substrate and a second substrate is irradiated with light from a backlight, a voltage is applied to the liquid crystal composition to change alignment of liquid crystal molecules, and thus an amount of light passing through the liquid crystal display panel is controlled. Such liquid crystal display device is characterized in reduced thickness, reduced weight, and low power consumption, and hence is utilized in an electronic device such as a smartphone, a tablet-type PC, and a car navigation system.

In the related art, there has been examined an alignment division technique for improving a viewing angle characteristic in which one pixel is divided into a plurality of alignment regions (domains) and liquid crystal molecules are aligned in different azimuthal directions in different alignment regions. As related-art documents that disclose the alignment division technique, for example, PTL 1 to PTL 4 are given.

Each of PTL 1 and PTL 2 discloses a 4Domain-Reverse Twisted Nematic (4D-RTN) mode in which a half pixel is divided into four alignment regions including two columns and two rows and one pixel is divided into eight alignment regions.

PTL 3 discloses a liquid crystal display device, including a display substrate that includes a plurality of pixel areas and has a curved surface shape being curved based on a first direction, a counter substrate that faces the display substrate, is integrated with the display substrate, and has a curved surface shape together with the display substrate, and a liquid crystal layer that is arranged between the display substrate and the counter substrate, wherein a plurality of domains are defined in each of the plurality of pixel areas, in at least two domains in the plurality of domains, directions in which liquid crystal molecules of the liquid crystal layer are aligned are different from each other, and the plurality of domains are arrayed in a second direction intersecting the first direction.

PTL 4 discloses a liquid crystal display panel, including, in the following order, a first substrate including a pixel electrode, a liquid crystal layer containing liquid crystal molecules, and a second substrate including a counter electrode. The liquid crystal display panel includes pixels having at least four alignment regions including a first alignment region, a second alignment region, a third alignment region, and a fourth alignment region. In the four alignment regions, tilt azimuthal directions of the liquid crystal molecules are different from one another. Along a longitudinal direction of the pixels, the first alignment region, the second alignment region, the third alignment region, and the fourth alignment region are arranged in the stated order. In the first alignment region and the second alignment region, the tilt azimuthal directions of the liquid crystal molecules are different from each other by approximately 180°, or alternatively, in the third alignment region and the fourth alignment region, the tilt azimuthal directions of the liquid crystal molecules are different from each other by approximately 180°.

CITATION LIST

Patent Literature

PTL 1: JP 5184618 B
PTL 2: JP 2011-85738 A
PTL 3: JP 2015-31961 A
PTL 4: WO 2017/047532

SUMMARY

Technical Problem

As a configuration of the liquid crystal display panel, there is exemplified a configuration in which an alignment film is provided to each of a space between a first substrate and a liquid crystal layer and a space between a second substrate and the liquid crystal layer. In a general method, liquid crystal molecules in the liquid crystal layer are aligned in desired azimuthal directions by subjecting both the alignment film on the first substrate side and the alignment film on the second substrate side to alignment process.

However, in the known method of subjecting both the alignment film on the first substrate side and the alignment film on the second substrate side to alignment process, there arises a problem of increasing the number of times of alignment process in manufacturing processes and lowering production capacity. In order to improve production capacity, a plurality of processes of alignment process can be performed simultaneously by increasing photo-irradiation mechanisms for irradiating the substrates with light. However, there may be a concern of increasing a size of a photo-alignment processing device and increasing a cost of the photo-alignment processing device, which may lead to increase of a manufacturing cost of the liquid crystal display panel.

The disclosure has been made in view of the above-mentioned circumstances, and has an object to provide a liquid crystal display panel capable of maintaining sufficient transmittance even with the less number of times for alignment process and a method for manufacturing the liquid crystal display panel, which is suitable for manufacturing of the liquid crystal display panel.

Solution to Problem

The inventors have examined a method of achieving a liquid crystal display panel having sufficient transmittance with a small number of times of alignment process, and have found out that sufficient transmittance can be obtained even when only any one of an alignment film of a first substrate and an alignment film of a second substrate is subjected to alignment process and the number of times of alignment process is reduced. With this, the inventors have arrived at the disclosure, which can successfully solve the above-mentioned problem.

Specifically, according to an aspect of the disclosure, a liquid crystal display panel includes, in the following order, a first substrate including a pixel electrode, a first vertical alignment film, a liquid crystal layer containing liquid crystal molecules, a second vertical alignment film, and a second substrate including a common electrode, wherein, when no voltage is applied to the liquid crystal layer, a first tilt angle of the liquid crystal molecules adjacent to the first vertical alignment film with respect to the first vertical alignment film and a second tilt angle of the liquid crystal molecules adjacent to the second vertical alignment film with respect to the second vertical alignment film differ from each other, in a case where the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, any one of the first vertical alignment film and the second vertical alignment film is a photo-alignment film subjected to alignment process such that a plurality of domains, the alignment vectors of which differ from each other, are formed in a region of a display unit, and the display unit includes, in the following order along a first direction of the display unit in a plan view, a first domain, a second domain, a third domain, and a fourth domain, the alignment vectors of which differ from each other, when a voltage is applied to the liquid crystal layer.

According to another aspect of the disclosure, a liquid crystal display panel includes, in the following order, a first substrate including a pixel electrode, a first vertical alignment film, a liquid crystal layer containing liquid crystal molecules, a second vertical alignment film, and a second substrate including a common electrode, wherein, in a case where the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, any one of the first vertical alignment film and the second vertical alignment film is a photo-alignment film subjected to alignment process such that a plurality of domains, the alignment vectors of which differ from each other, are formed in a region of a display unit, the other one of the first vertical alignment film and the second vertical alignment film is not subjected to the alignment process, and the display unit includes, in the following order along a first direction of the display unit in a plan view, a first domain, a second domain, a third domain, and a fourth domain, the alignment vectors of which differ from each other, when a voltage is applied to the liquid crystal layer.

According to yet another aspect of the disclosure, a method for manufacturing the liquid crystal display panel according to the disclosure includes forming a vertical alignment film on any one of the first substrate and the second substrate, wherein, the forming a vertical alignment film is a step in which a coating film is formed by applying, on any one of the first substrate and the second substrate, an alignment film composition containing a material having a photo-alignment property, and alignment process is performed such that the coating film is irradiated with light from a light source, and the alignment process is performed at a plurality of scanning steps such that four alignment regions where exposure directions on the coating film differ from each other and form an angle of approximately 45° with respect to the first direction are formed along the first direction.

Advantageous Effects of Disclosure

According to the disclosure, there can be provided the liquid crystal display panel capable of maintaining sufficient transmittance even with the less number of times for alignment process and the method for manufacturing the liquid crystal display panel, which is suitable for manufacturing of the liquid crystal display panel.

BRIEF DESCRIPTION OF DRAWINGS

FIG. 14 is a view illustrating alignment process of a CF substrate (second substrate) in Example 1.

FIG. 17 is a view illustrating alignment process of a TFT substrate (first substrate) in Example 3.

FIG. 19(a) is a view illustrating alignment process of a TFT substrate (first substrate) in Comparative Example 1, and FIG. 19(b) is a view illustrating alignment process of a CF substrate (second substrate) in Comparative Example 1.

FIG. 22(a) is a view illustrating alignment process of a TFT substrate (first substrate) in Comparative Example 3, and FIG. 22(b) is a view illustrating alignment process of a CF substrate (second substrate) in Comparative Example 3.

DESCRIPTION OF EMBODIMENTS

Figure 1:
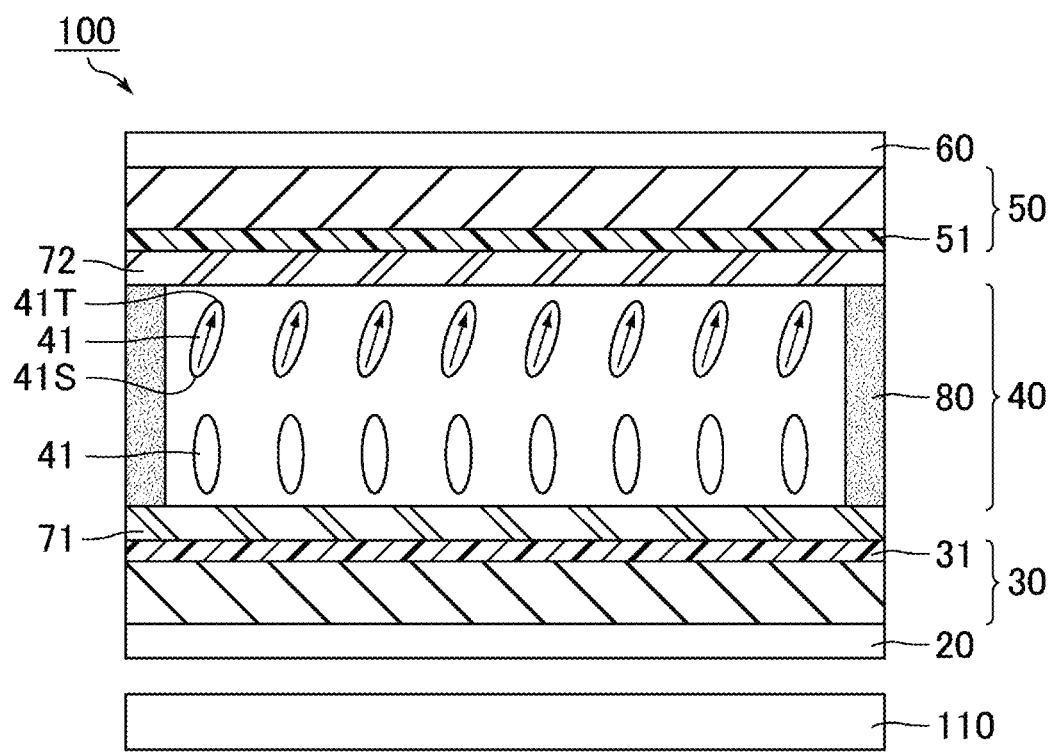
FIG. 1 is a cross-sectional view schematically illustrating one example of a liquid crystal display device according to an embodiment.

Now, description is made on an embodiment of the disclosure. The disclosure is not limited to contents described in the embodiment below, and a design change can be made as appropriate within a range of satisfying the configuration of the disclosure.

According to an aspect of the disclosure, a liquid crystal display panel includes, in the following order, a first substrate including a pixel electrode, a first vertical alignment film, a liquid crystal layer containing liquid crystal molecules, a second vertical alignment film, and a second substrate including a common electrode, wherein, when no voltage is applied to the liquid crystal layer, a first tilt angle of the liquid crystal molecules adjacent to the first vertical alignment film with respect to the first vertical alignment film and a second tilt angle of the liquid crystal molecules adjacent to the second vertical alignment film with respect to the second vertical alignment film differ from each other, in a case where the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, any one of the first vertical alignment film and the second vertical alignment film is a photo-alignment film subjected to alignment process such that a plurality of domains, the alignment vectors of which differ from each other, are formed in a region of a display unit, and the display unit includes, in the following order along a first direction of the display unit in a plan view, a first domain, a second domain, a third domain, and a fourth domain, the alignment vectors of which differ from each other, when a voltage is applied to the liquid crystal layer.

According to another aspect of the disclosure, a liquid crystal display panel includes, in the following order, a first substrate including a pixel electrode, a first vertical alignment film, a liquid crystal layer containing liquid crystal molecules, a second vertical alignment film, and a second substrate including a common electrode, wherein, in a case where the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, any one of the first vertical alignment film and the second vertical alignment film is a photo-alignment film subjected to alignment process such that a plurality of domains, the alignment vectors of which differ from each other, are formed in a region of a display unit, the other one of the first vertical alignment film and the second vertical alignment film is not subjected to the alignment process, and the display unit includes, in the following order along a first direction of the display unit in a plan view, a first domain, a second domain, a third domain, and a fourth domain, the alignment vectors of which differ from each other, when a voltage is applied to the liquid crystal layer.

FIG. 1 is a cross-sectional view schematically illustrating one example of a liquid crystal display device according to an embodiment. As illustrated in FIG. 1, the liquid crystal display device according to the present embodiment includes a liquid crystal display panel 100 and a backlight 110 arranged on a back side of the liquid crystal display panel 100. The liquid crystal display panel 100 includes, in the following order, a first substrate 30 including pixel electrodes 31, a first vertical alignment film 71, a liquid crystal layer 40 containing liquid crystal molecules 41, a second vertical alignment film 72, and a second substrate 50 including counter electrodes 51. The liquid crystal display panel 100 includes a back face-side polarizer 20 on a side of the first substrate 30, which is opposite to the liquid crystal layer 40, a display surface-side polarizer 60 on a side of the second substrate 50, which is opposite to the liquid crystal layer 40, and a sealing member 80 in the periphery of the liquid crystal layer 40.

First, description is made on a display system of the liquid crystal display device according to the present embodiment. In the liquid crystal display device according to the present embodiment, light enters the liquid crystal display panel 100 from the backlight 110, alignment of the liquid crystal molecules 41 of the liquid crystal layer 40 is switched, and thus an amount of light passing through the liquid crystal display panel 100 is controlled. The alignment of the liquid crystal molecules 41 is switched by applying a voltage from the plurality of pixel electrodes 31 and the plurality of counter electrodes 51 to the liquid crystal layer 40. In a case where an applied voltage to the liquid crystal layer 40 is less than a threshold value (when no voltage is applied), the first vertical alignment film 71 and the second vertical alignment film 72 regulate initial alignment of the liquid crystal molecules 41.

Any one of the first vertical alignment film 71 and the second vertical alignment film 72 is a photo-alignment film subjected to alignment process such that a plurality of domains, the alignment vectors of which differ from each other, are formed in one display unit region. The photo-alignment film is formed of a photo-alignment film material. The other vertical alignment film is not subjected to alignment process. The other vertical alignment film may be a photo-alignment film, or may not contain a photo-alignment film material. Only any one of the first vertical alignment film 71 and the second vertical alignment film 72 is subjected to alignment process, and hence the number of times of alignment process can be reduced.

In this specification, the term "alignment process" indicates polarized light irradiation with respect to the first vertical alignment film 71 or the second vertical alignment film 72, and does not indicate non-polarized light irradiation. It is preferred that the polarized light be linearly polarized light. The vertical alignment film that is not subjected to alignment process may be subjected to non-polarized light irradiation. When the vertical alignment film that is not subjected to alignment process is subjected to non-polarized light irradiation, both the substrates can be subjected to an equal manufacturing process, and generation of a residual direct current (DC) voltage can be suppressed. Thus, reliability of the liquid crystal display panel can be improved. Note that with non-polarized light irradiation, the alignment directions of the liquid crystal molecules are not in one direction. Thus, when no voltage is applied to the liquid crystal layer 40, liquid crystal molecules adjacent to the vertical alignment film subjected to non-polarized light irradiation are aligned substantially vertical with respect to the vertical alignment film subjected to non-polarized light irradiation. Note that non-polarized light irradiation described above can be performed with a device that does not include members such as a polarizer 230 and a light blocking member 240 described later, does not require adjustment of an irradiation angle, and hence is a simple process with a fast processing speed as compared to alignment process described above. Thus, even when non-polarized light irradiation described above is performed, a problem of increasing a manufacturing cost and lowering production capacity does not arise.

Only any one of the first vertical alignment film 71 and the second vertical alignment film 72 is subjected to alignment process. Thus, when no voltage is applied to the liquid crystal layer 40, a first tilt angle of the liquid crystal molecules adjacent to the first vertical alignment film 71 with respect to the first vertical alignment film 71 and a second tilt angle of the liquid crystal molecules adjacent to the second vertical alignment film 72 with respect to the second vertical alignment film 72 can be different from each other. When no voltage is applied to the liquid crystal layer 40, a difference between the first tilt angle and the second tilt angle may be 30° or less. When the difference exceeds 30°, there may be a possibility of lowering contrast of the liquid crystal display panel. A lower limit of the difference is preferably 1°, and an upper limit of the difference is preferably 20°, more preferably, 10°, particularly preferably, 5°.

When no voltage is applied to the liquid crystal layer 40, the tilt angle of the liquid crystal molecules adjacent to the vertical alignment film subjected to alignment process, which is selected from the first vertical alignment film 71 and the second vertical alignment film 72, may be 86° or greater and less than 90°. When no voltage is applied to the liquid crystal layer 40, the liquid crystal molecules adjacent to the vertical alignment film that is not subjected to alignment process is preferably aligned substantially vertically with respect to the vertical alignment film that is not subjected to alignment process described above. When a voltage is applied between the pixel electrodes 31 and the counter electrodes 51, a vertical electric field is generated in the liquid crystal layer 40, and the liquid crystal molecules 41 in the liquid crystal layer 40 are aligned in a further largely tilted manner along the tilt azimuthal directions of the liquid crystal molecules adjacent to the vertical alignment film subjected to alignment process described above.

In this specification, description is made on the tilt azimuthal direction of the liquid crystal molecule 41 by utilizing an alignment vector in a case that an end closer to the first substrate 30 in a long axis direction of the liquid crystal molecules 40 is denoted by a starting point (hereinafter, also referred to as "tail of liquid crystal director") 41S and an end closer to the second substrate 50 in the long axis direction of the liquid crystal molecules 40 is denoted by a terminal point (hereinafter, also referred to as "head of liquid crystal director") 41T when the liquid crystal display panel 100 is seen in a plan view as appropriate. Note that the alignment vector is in the same direction as the tilt azimuthal direction of the liquid crystal molecule 41 with respect to the first vertical alignment film 71 on the first substrate 30 side, and is in the reverse direction to the tilt azimuthal direction of the liquid crystal molecule 41 with respect to the second vertical alignment film 72 on the second substrate 50 side. In this specification, the term "azimuthal direction" indicates orientation as seen with projection on a substrate plane, and a tilt angle (polar angle, pre-tilt angle) with respect to a normal direction of the substrate plane is not considered. In a case where a voltage is applied, the liquid crystal molecules 41 are aligned in a largely tilted manner while maintaining the tilt azimuthal directions at the time when no voltage is applied. Thus, the starting point 41S and the terminal point 41T of the alignment vector may be confirmed under a state in which a voltage is applied to the liquid crystal layer 40.

Any of the first vertical alignment film 71 and the second vertical alignment film 72 may be subjected to alignment process. However, in view of improving a response speed of the liquid crystal display panel, the second vertical alignment film 72 is preferably subjected to alignment process. Here, when the first vertical alignment film 71 formed on the first substrate 30 is subjected to alignment process, the liquid crystal molecules 41 in the vicinity of the first substrate 30 are applied with a constant pre-tilt angle and a constant pre-tilt azimuthal direction due to an alignment regulating force of the first vertical alignment film 71. When a voltage is applied to the liquid crystal layer 40, the liquid crystal molecules 41 are uniformly aligned horizontally with respect to the substrate in conformity with the pre-tilt azimuthal direction. Further, in a case where slits are formed in the pixel electrodes 31, when a voltage is applied to the liquid crystal layer 40, an electric field formed by the slits 32 is generated. A response speed of the liquid crystal molecules 41 depends on the pre-tilt angle of the liquid crystal molecules 41 at the time when no voltage is applied, a magnitude of the electric field and orientation of the electric field at the time when a voltage is applied, and the like. When the first vertical alignment film 71 is subjected to alignment process, the pre-tilt azimuthal direction and orientation of the electric field of the liquid crystal molecules 41 are different from each other, and hence directions of alignment regulating forces are not aligned, which may cause a possibility of delaying a response of the liquid crystal molecules 41. Meanwhile, in a case where the second vertical alignment film 72 formed on the second substrate 50 is subjected to alignment process, when a voltage is applied to the liquid crystal layer 40, an alignment regulating force of the electric field formed by the slits 32 acts on the liquid crystal molecules 41 in the vicinity of the first substrate 30, and an alignment regulating force of the second vertical alignment film 72 acts on the liquid crystal molecules 41 in the vicinity of the second substrate 50. The two alignment regulating forces do not collide with each other, and hence the liquid crystal molecules 41 can smoothly move when only the second vertical alignment film 72 is subjected to alignment process.

Whether the first vertical alignment film 71 or the second vertical alignment film 72 is subjected to alignment process can be confirmed by measuring an average tilt angle of the liquid crystal molecules in the liquid crystal layer. First, the liquid crystal display panel is dismantled, and the first substrate and the second substrate are taken out. Each of the first substrate and the second substrate that are taken out is attached to another substrate, and a liquid crystal composition fills therein. In this manner, an alignment confirmation cell for the first substrate and an alignment confirmation cell for the second substrate are produced. The other substrate is a substrate including electrodes and a vertical alignment film formed thereon. The vertical alignment is not subjected to alignment process for applying a pre-tilt angle. With respect to each of the alignment confirmation cell for the first substrate and the alignment confirmation cell for the second substrate, the average tilt angle of the liquid crystal molecules in the liquid crystal layer is measured under a state of not applying a voltage.

The average tilt angle measurement can be performed through use of, for example, a polarized light analysis device (OPTIPRO available from SHINTEC Co., Ltd.). A pre-tilt angle obtained by the polarized light analysis device is an average value (an average value in bulk) of tilt angles of the liquid crystal molecules of the liquid crystal layer. There is a correlation between the average tilt angle of the liquid crystal molecules and a tilt angle (pre-tilt angle) of the liquid crystal molecules at an interface between the first vertical alignment film 71 or the second vertical alignment film 72, and the liquid crystal layer 40. The average tilt angle is measured for each of the confirmation cells. With this, whether the alignment film formed on the first substrate and the alignment film formed on the second substrate are subjected to alignment process can be determined. The pre-tilt angle of the liquid crystal molecules with respect to each of the alignment film can be calculated from the value of the average tilt angle.

The photo-alignment film material indicates a general material that has a structural change caused by irradiation with light (electromagnetic waves) such as ultraviolet light and visible light, and exhibits a characteristic (alignment regulating force) of regulating the alignment of the liquid crystal molecules 41 present in the vicinity, and that changes in a magnitude and/or orientation of the alignment regulating force. The photo-alignment film material includes, for example, a photoreactive site in which a reaction such as dimerizaion (formation of a dimer), isomerization, photo fries rearrangement, and decomposition is caused by photo-irradiation. Examples of the photoreactive site (functional group) that is dimerized and isomerized by photo-irradiation include cinnamates, cinnamoyl, 4-chalcone, coumarin, stilbene, and the like. Examples of the photoreactive site (functional group) that is isomerized by photo-irradiation include azobenzene and the like. Examples of the photoreactive site that is subjected to photo fries rearrangement due to photo-irradiation include a phenolic ester structure and the like. Examples of the photoreactive site that is decomposed by photo-irradiation include a dianhydride containing a cyclobutane ring, such as 1,2,3,4-cyclobutane tetracarboxylic acid-1,2:3,4-dianhydride (CBDA), and the like. The photo-alignment film material preferably has a vertical alignment property that enables use in a vertical alignment mode. Examples of the photo-alignment film material include polyamide (polyamic acid), polyimide, a polysiloxane derivative, methyl methacrylate, polyvinyl alcohol, and the like including a photoreactive site.

Figure 2:
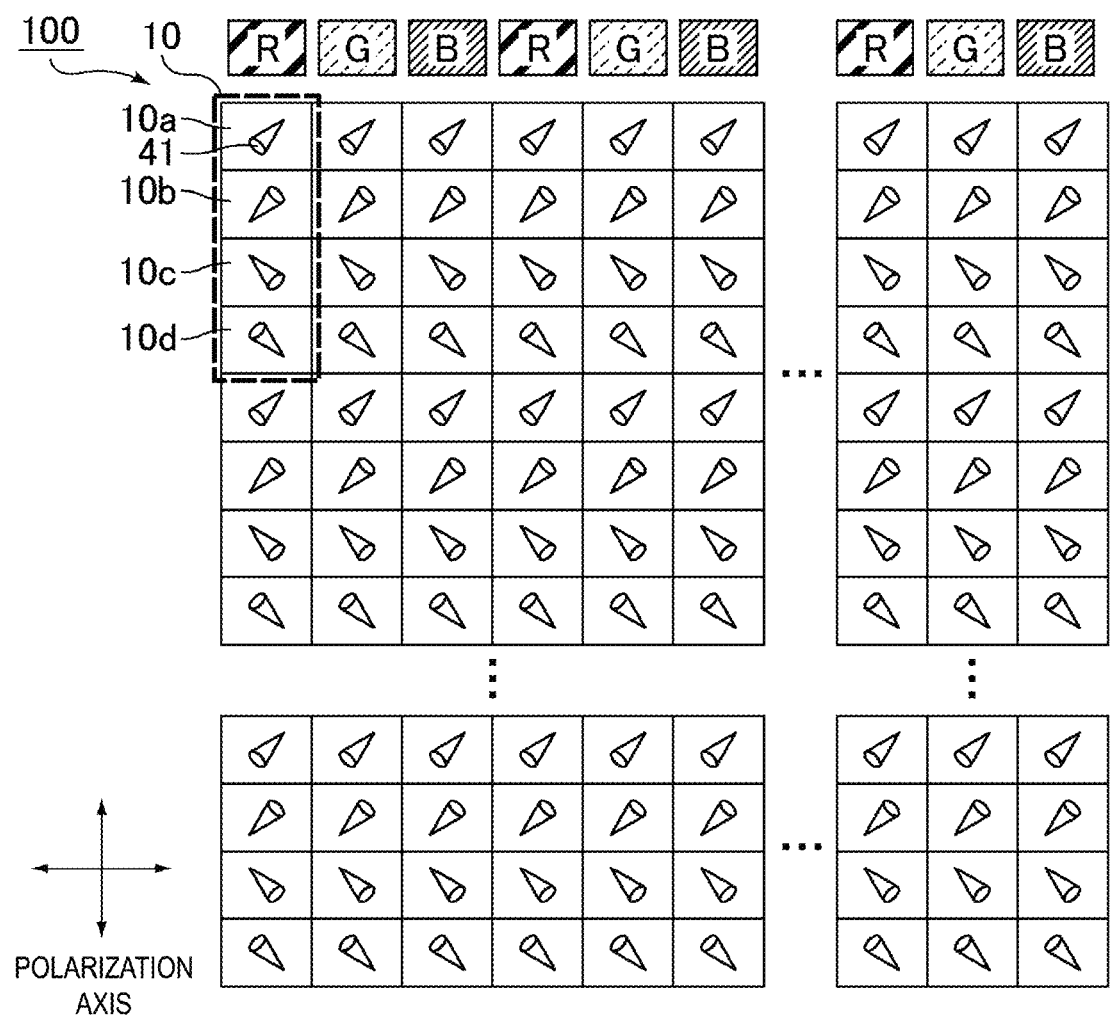
FIG. 2 is a plan view schematically illustrating tilt azimuthal directions of liquid crystal molecules in a liquid crystal layer in the embodiment.

FIG. 2 is a plan view schematically illustrating the tilt azimuthal directions of the liquid crystal molecules in the liquid crystal layer in the embodiment. As illustrated in FIG. 2, on the liquid crystal display panel 100 according to the present embodiment, a plurality of pixels 10 are arrayed in a matrix shape. Here, a display unit region indicates a region overlapping with a single pixel electrode 31. The display unit region is also referred to as a pixel. The liquid crystal display panel 100 includes pixels that overlap with R (red) color filters, pixels that overlap with G (green) color filters, and pixels that overlap with B (blue) color filters. In FIG. 2, a part surrounded by the dotted line corresponds to one display unit (one pixel). In the present embodiment, the second substrate 50 in which the red (R) color filter, the green (G) color filter, and the blue (B) color filter are arranged in the stated order on a row basis is used.

In the pixel 10, a plurality of domains having different alignment vectors are provided. These domains can be formed by subjecting any one of the first vertical alignment film 71 and the second vertical alignment film 72 to alignment process. When a voltage is applied to the liquid crystal layer 40, the liquid crystal molecules 41 are aligned in a tilted manner to match with the alignment vectors of the plurality of domains.

Figure 3:
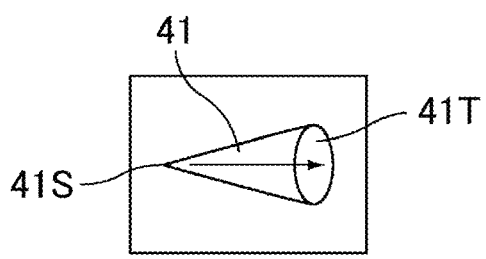
FIG. 3 is a view illustrating a relationship between the tilt azimuthal directions of the liquid crystal molecules and alignment vectors.

FIG. 2 illustrates the liquid crystal molecules 41 with pins (cones) for easy understanding of the tilt azimuthal directions of the liquid crystal molecules 41. A bottom surface of the cone indicates the second substrate 50 side (observer side), and an apex of the cone indicates the first substrate 30 side. FIG. 2 illustrates a case where the liquid crystal display panel 100 is observed from the second substrate 50 side. FIG. 3 is a view illustrating a relationship between the tilt azimuthal directions of the liquid crystal molecules and the alignment vectors. As illustrated in FIG. 2, when a voltage is applied to the liquid crystal layer 40, in a plan view, the display unit 10 includes a first domain 10a, a second domain 10b, a third domain 10c, and a fourth domain 10d, which have alignment vectors different from one another, in the stated order along a first direction of the display unit 10. The alignment vectors of the four domains included in one display unit are different from one another, and hence a viewing angle characteristic of the liquid crystal display panel 100 can be improved. In a case where the first direction is set parallel to any one of a polarization axis of the back face-side polarizer 20 and a polarization axis of the display surface-side polarizer 60, each of the alignment vectors of the four domains preferably forms an angle of 45° with the first direction. With this arrangement, transmittance of the display unit 10 can be improved.

When a voltage is applied to the liquid crystal layer 40, two adjacent domains in one display unit may have terminal points of the liquid crystal molecules facing with each other, and the alignment vectors of the two adjacent domains may be parallel to each other (may form an angle of approximately 180°) (hereinafter, referred to as a first boundary condition). The two adjacent domains in one display unit may have the terminal points of the liquid crystal molecules facing with each other, and the alignment vectors of the two adjacent domains may be orthogonal to each other (may form an angle of approximately 90°) (hereinafter, referred to as a second boundary condition). The two adjacent domains in one display unit may have starting points of the liquid crystal molecules facing with each other, and the alignment vectors of the two adjacent domains may be parallel to each other (may form an angle of approximately 180°) (hereinafter, referred to as a third boundary condition). The two adjacent domains in one display unit may have the starting points of the liquid crystal molecules facing with each other, and the alignment vectors of the two adjacent domains may be orthogonal to each other (may form an angle of approximately 90°) (hereinafter, referred to as a fourth boundary condition). With regard to the two adjacent domains in one display unit, a starting point of a liquid crystal molecule in one domain and a terminal point of a liquid crystal molecule in the other domain may face with each other (hereinafter, referred to as a fifth boundary condition).

Note that the alignment vector in each domain is positioned at the center of the domain in a plan view, and can be determined by orientation of the liquid crystal molecule 41 positioned at the center of the liquid crystal layer in a cross-sectional view. In this specification, the term "orthogonal (form an angle of approximately 90°)" includes a substantially orthogonal state within a range of obtaining effects of the disclosure, and specifically indicates formation of an angle of from 75° to 105°, preferably, an angle of from 80° to 100°, more preferably, an angle of from 85° to 95°. In this specification, the term "parallel (form an angle of approximately 180°)" includes a substantially parallel state within a range of obtaining effects of the disclosure, and specifically indicates formation of an angle of from −15° to +15°, preferably an angle of from 10° to +10°, more preferably, an angle of from −5° to +5°.

A relationship between the first domain 10a and the second domain 10b and a relationship between the third domain 10c and the fourth domain 10d in the display unit 10, which are illustrated in FIG. 2, correspond to the first boundary condition. A relationship between the second domain 10b and third domain 10c illustrated in FIG. 2 corresponds to the fourth boundary condition. The display unit 10 includes the first boundary condition, the fourth boundary condition, and the first boundary condition in the stated order in one display unit.

Figure 4:
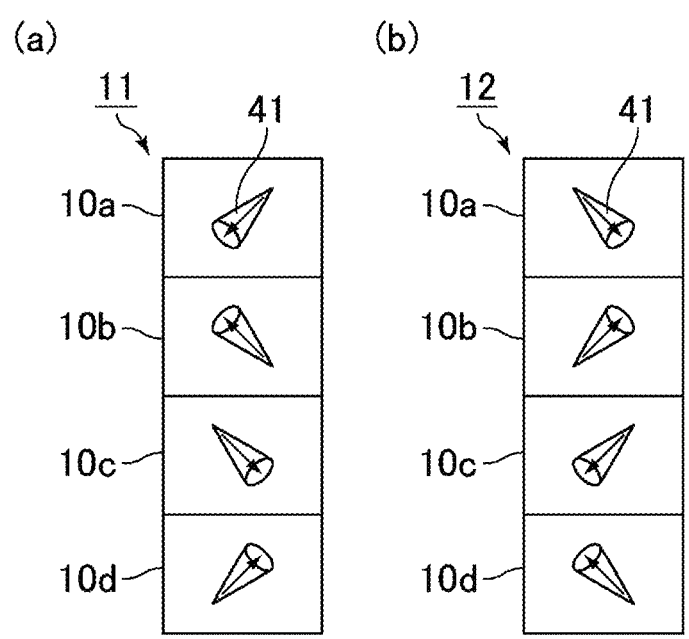
FIG. 4 is a plan view schematically illustrating other tilt azimuthal directions of the liquid crystal molecules in the liquid crystal layer.

(a) and (b) of FIG. 4 are plan views schematically illustrating other tilt azimuthal directions of the liquid crystal molecules in the liquid crystal layer. (a) and (b) of FIG. 4 illustrate a case where the liquid crystal display panel 100 is observed from the second substrate 50 side. A relationship between the first domain 10a and the second domain 10b and a relationship between the third domain 10c and the fourth domain 10d in a display unit 11, which are illustrated in (a) of FIG. 4, and a relationship between the first domain 10a and the second domain 10b and a relationship between the third domain 10c and the fourth domain 10d in a display unit 12, which are illustrated in (b) of FIG. 4, all correspond to the second boundary condition. A relationship between the second domain 10b and the third domain 10c in the display unit 11 and a relationship between the second domain 10b and the third domain 10c in the display unit 12 all correspond to the third boundary condition. The display units 11 and 12 each include the second boundary condition, the third boundary condition, and the second boundary condition in the stated order in one display unit.

In order to achieve a satisfactory viewing angle characteristic, the display units 10, 11, and 12 each include a combination of the four alignment vectors in which the alignment vector of the first domain 10a, the alignment vector of the second domain 10b, the alignment vector of the third domain 10c, and the alignment vector of the fourth domain 10d are oriented in different directions by 90°.

When no voltage is applied to the liquid crystal layer, a twist angle of the liquid crystal molecule between the first substrate and the second substrate may be 45° or less. It is preferred that the twist angle be approximately 0°. That is, in the first domain 10a, the second domain 10b, the third domain 10c, and the fourth domain 10d, an angle formed between the tilt azimuthal direction of the liquid crystal molecule 41 with respect to the first vertical alignment film 71 on the first substrate 30 side and the tilt azimuthal direction of the liquid crystal molecule 41 with respect to the second vertical alignment film 72 on the second substrate 50 side is preferably, 45° or less, more preferably, approximately 0°.

Figure 5:
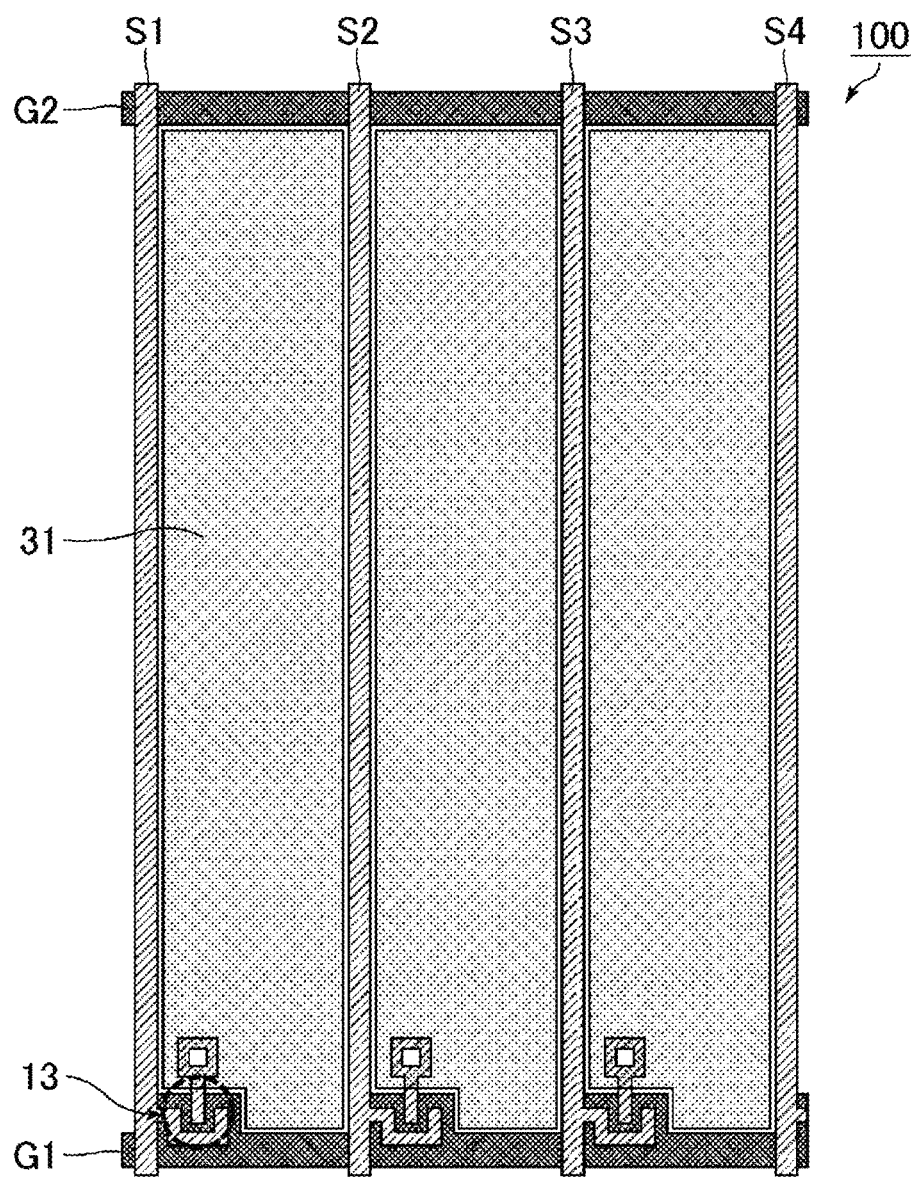
FIG. 5 is a plan view schematically illustrating an electrode and wiring line structure in a first substrate in the embodiment.

Next, description is made on an overall configuration of the liquid crystal display device according to the present embodiment. The first substrate 30 may be, for example, an active matrix substrate (TFT substrate). The TFT substrate that is generally used in a field of the liquid crystal display panel may be used. FIG. 5 is a plan view schematically illustrating an electrode and wiring line structure in the first substrate in the embodiment. Examples of the configuration of the TFT substrate in a plan view include a configuration of providing, on a transparent substrate, a plurality of parallel gate signal lines G1 and G2, a plurality of source signal lines S1, S2, S3, and S4, which extend in a direction orthogonal to the gate signal lines and are formed to be parallel to one another, active elements such as TFTs 13 arranged correspondingly to intersection points between the gate signal lines and the source signal lines, the pixel electrodes 31 arranged in a matrix shape in regions defined by the gate signal lines and the source signal lines, and the like. Capacitance wiring lines may be arranged in parallel to the gate signal lines G.

An oxide semiconductor is used to form a channel, and the resultant is suitably used as the TFT. Examples of the oxide semiconductor include a compound (In—Ga—Zn—O) formed of indium (In), gallium (Ga), zinc (Zn), and oxygen (O), a compound (In—Tin—Zn—O) formed of indium (In), tin (Tin), zinc (Zn), and oxygen (O), a compound (In—Al—Zn—O) formed of indium (In), aluminum (Al), zinc (Zn), and oxygen (O), and the like.

The pixel electrodes 31 are preferably arranged to overlap with the first domain 10a, the second domain 10b, the third domain 10c, and the fourth domain 10d. A single pixel electrode 31 is arranged to overlap with the four domains. Thus, an electric field having the same magnitude is applied to the first domain 10a, the second domain 10b, the third domain 10c, and the fourth domain 10d in a thickness direction of the liquid crystal layer 40 when a voltage is applied to the liquid crystal layer 40.

Figure 6:
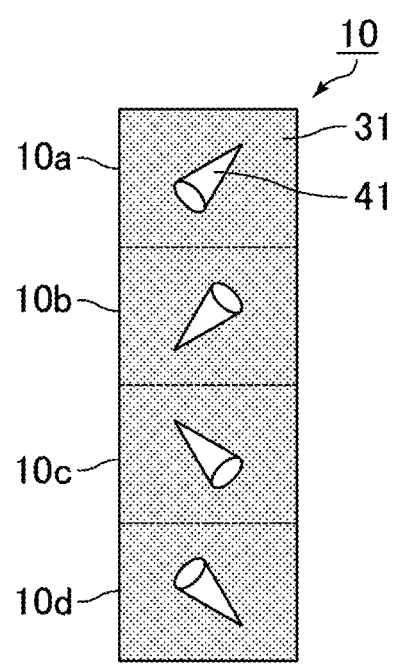
FIG. 6 is a schematic plan view illustrating an example of a pixel electrode without slits.
Figure 7:
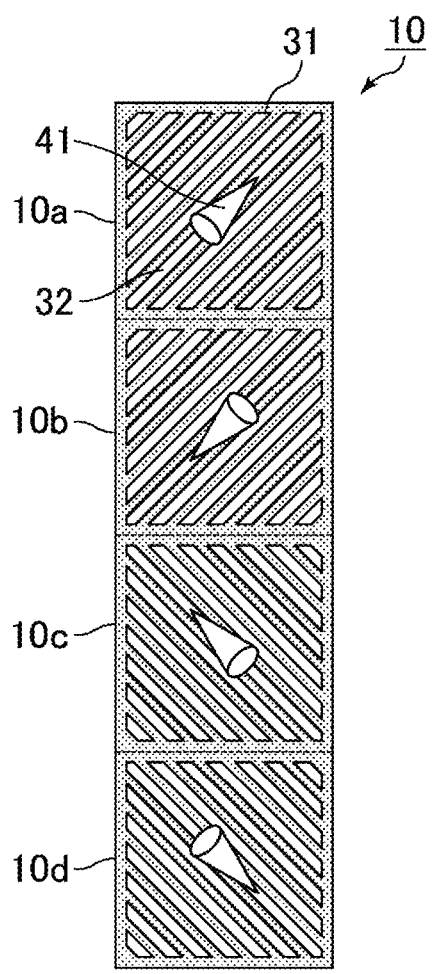
FIG. 7 is a schematic plan view illustrating an example of a pixel electrode with slits.

The pixel electrode 31 may be a planar electrode (solid electrode) without slits, or may be provided with slits. FIG. 6 is a schematic plan view illustrating an example of the pixel electrode without slits. When slits are not provided in the pixel electrodes 31, luminance unevenness among the pixels due to variation of slit processing is not caused. Thus, even in a case that the display panel is applied to a liquid crystal display panel with a large screen, display unevenness is less likely to be visually recognized. FIG. 6 and FIG. 7 described later illustrate a case where the liquid crystal display panel 100 is observed from the second substrate 50 side.

FIG. 7 is a schematic plan view illustrating an example of the pixel electrode with slits. As illustrated in FIG. 7, the pixel electrodes 31 may be provided with at least one slit 32. By providing the slits 32, the tilt azimuthal directions of the liquid crystal molecules 41 can be controlled with the electric field formed with the slits at the time of voltage application.

The slits 32 are provided in regions of the pixel electrode 31 overlapping with the above-described domains. When a voltage is applied to the liquid crystal layer 40, the alignment vectors of the domains may be parallel to extension directions of the slits 32. The slits 32 may be provided in the entire regions of the pixel electrode 31 overlapping with the domains.

A width of the slit 32 may be 1 μm to 8 μm. When the plurality of slits 32 are provided, a distance between the adjacent slits 32 may be, for example, 1 μm to 8 μm.

The pixel electrode 31 may be a transparent electrode, and may be formed of, for example, a transparent conductive material such as indium tin oxide (ITO), indium zinc oxide (IZO), zinc oxide (ZnO), tin oxide (SnO), and the like or an alloy of those.

The second substrate 50 includes the counter electrodes 51, and may be a color filter substrate (CF substrate), for example. The color filter substrate that is generally used in a field of the liquid crystal display panel may be used. Examples of the configuration of the color filter substrate include a configuration of providing, on a transparent substrate, a black matrix formed in a lattice pattern and color filters formed on an inner side of the lattice, that is, the pixel, and the like. The black matrix may be formed in a lattice pattern on one pixel basis while overlapping with boundaries of the pixels, and may further be formed in a lattice pattern on a half pixel basis while transversely crossing a center of one pixel in a short-hand direction. The black matrix is formed to overlap with regions in which dark lines are formed. With this, the dark lines are less likely to be observed.

The counter electrodes 51 are arranged to face the pixel electrodes 31 with the liquid crystal layer 40 interposed therebetween. A vertical electrical field is formed between the counter electrodes 51 and the pixel electrodes 31, and the liquid crystal molecules 41 are tilted. In this manner, display can be performed. For example, the color filters may be arranged on a row basis in the order of red (R), green (G), and blue (B), in the order of yellow (Y), red (R), green (G), and blue (B), or in the order of red (R), green (G), blue (B), and green (G).

The counter electrode 51 is preferably a planar electrode. The counter electrodes 51 may be a transparent electrode, and may be formed of, for example, a transparent conductive material such as indium tin oxide (ITO), indium zinc oxide (IZO), zinc oxide (ZnO), tin oxide (SnO), and the like or an alloy of those.

In the liquid crystal display panel 100 according to the present embodiment, the first substrate 30 and the second substrate 50 are attached to each other with the sealing member 80, which is provided to surround the periphery of the liquid crystal layer 40, and the liquid crystal layer 40 is retained in a predetermined region. As the sealing member 80, for example, an epoxy resin containing an inorganic filler or an organic filler and a curing agent or the like may be used.

In the present embodiment, a Polymer Sustained Alignment (PSA) technique may be adopted. With the PSA technique, a liquid crystal composition containing photo-polymerizable monomers is encapsulated between the first substrate 30 and the second substrate 50, and then the liquid crystal layer 40 is irradiated with light to polymerize the photo-polymerizable monomers. With this, polymers are formed on the surfaces of the first vertical alignment film 71 and the second vertical alignment film 72, and those polymers fix the initial tilt (pre-tilt) of the liquid crystal.

The polarization axis of the back face-side polarizer 20 and the polarization axis of the display surface-side polarizer 60 may be orthogonal to each other. Note that the polarization axis may be an absorption axis of the polarizer or a transmission axis of the polarizer. Typical examples of the back face-side polarizer 20 and the display surface-side polarizer 60 are obtained by causing anisotropic materials such as dichromatic iodine complexes to be aligned and absorbed in a polyvinyl alcohols (PVA) film. Generally, protection films such as triacetylcellulose films are laminated on both surfaces of the PVA film for practical use. Note that optical films such as phase difference films may be arranged between the back face-side polarizer 20 and the first substrate 30 and between the display surface-side polarizer 60 and the second substrate 50.

The backlight 110 is not particularly limited as long as the backlight emits light containing visible light. The backlight 110 may emit light containing only visible light, or may emit light containing both visible light and ultraviolet light. For enabling the liquid crystal display device to perform color display, a backlight emitting white light is preferably used. As a type of the backlight, a light emitting diode (LED) is preferably used, for example. Note that, in this specification, the term "visible light" indicates light (electromagnetic waves) having a wavelength of 380 nm or greater and less than 800 nm.

The liquid crystal display device according to the present embodiment is configured by an external circuit such as a tape carrier package (TCP) and a printed circuit board (PCB), an optical film such as a viewing angle expansion film and a luminance improving film, and a plurality of members such as a bezel (frame) in addition to the liquid crystal display panel 100 and the backlight 110. Some of the members may be incorporated in other members. Members other than the members that have been described already are not particularly limited, and members that are usually used in a field of the liquid crystal display device may be used. Thus, description therefor is omitted.

Figure 8:
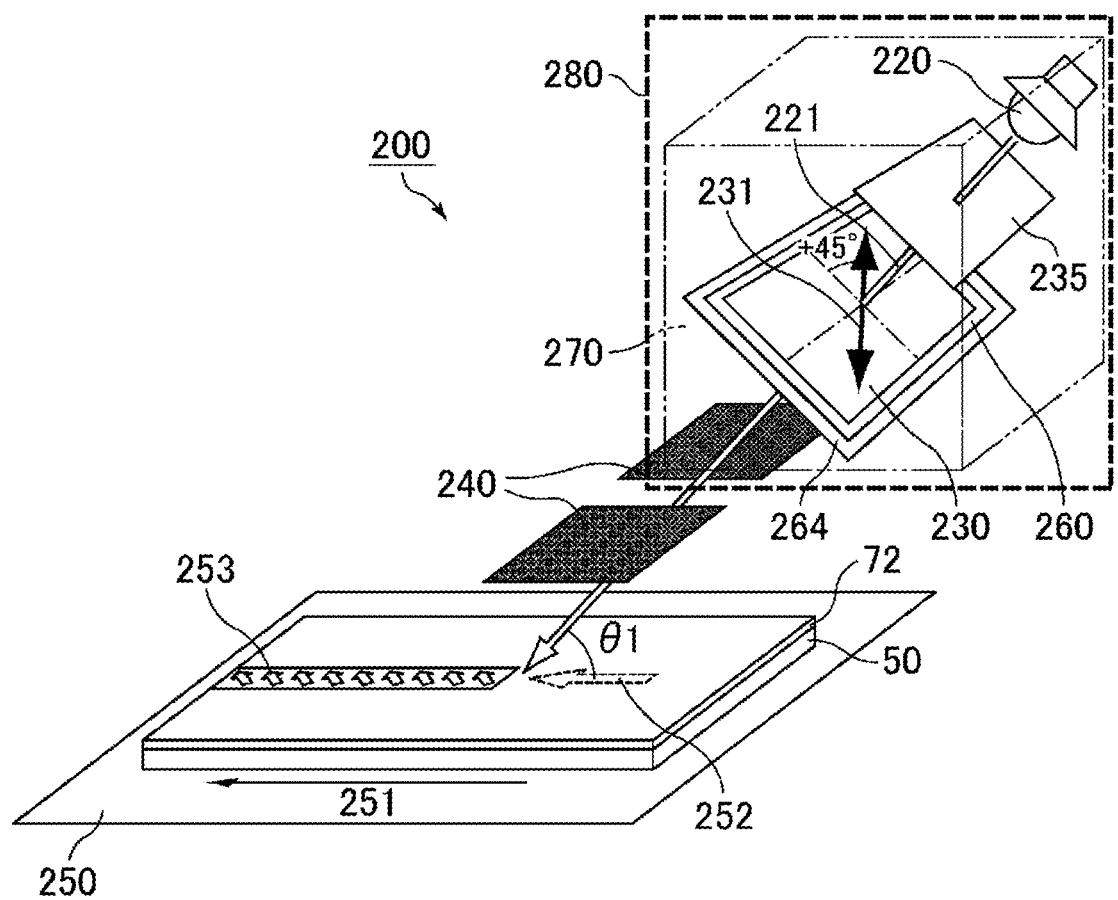
FIG. 8 is an outline view illustrating one example of a photo-alignment processing device.

A specific example of alignment process is given below. FIG. 8 is an outline view illustrating one example of a photo-alignment processing device. A photo-alignment processing device 200 illustrated in FIG. 8 subjects a photo-alignment film (vertical alignment film) formed on a liquid crystal display panel substrate, to photo-alignment process. FIG. 8 illustrates the second vertical alignment film 72 formed on the second substrate (liquid crystal display panel substrate) 50, but the first vertical alignment film 71 can also be subjected to treatment. The photo-alignment processing device 200 includes a photo-irradiation mechanism 280 and a stage 250 on which a liquid crystal display panel substrate is placed.

The photo-irradiation mechanism 280 includes a light source 220, the polarizer 230, and a rotation adjustment mechanism 260. The light source 220 and the polarizer 230 may be arranged in a lamp box 270. A type of the light source 220 is not particularly limited, and a light source that is usually used in a field of the photo-alignment processing device may be used. For example, a low-pressure mercury lamp, a deuterium lamp, a metal halide lamp, an argon resonance lamp, and a xenon lamp may be used.

Light 221 emitted from the light source 220 may be light (electromagnetic waves) such as ultraviolet light and visible light and the like, and preferably has a wavelength of from 280 nm to 400 nm.

For example, the polarizer 230 extracts linearly polarized light from the light emitted from the light source 220 to the liquid crystal display panel substrate. Note that the polarization axis indicates a direction in which an amount of light passing through the polarizer is maximized. Examples of the polarizer 230 include an organic resin-based polarizer, a wire grid polarizer, a polarizing beam splitter (PBS), and the like.

Examples of the organic resin-based polarizer include a polarizer obtained by causing iodine to be absorbed in polyvinylalcohol and extending the resultant in a sheet-like shape, and the like.

The wire grid polarizer including, for example, a light-transmissive base material and a plurality of metal thin wires formed on the light-transmissive base material may be given as an example. The plurality of metal thin wires are arranged in a cycle shorter than a wavelength of the light entering the wire grid polarizer. The metal thin wires are formed of, for example, a metal material such as chromium having a light absorbent property. By using the wire grid polarizer including the metal thin wires with different extension directions, alignment division treatment can be performed efficiently.

Figure 9:
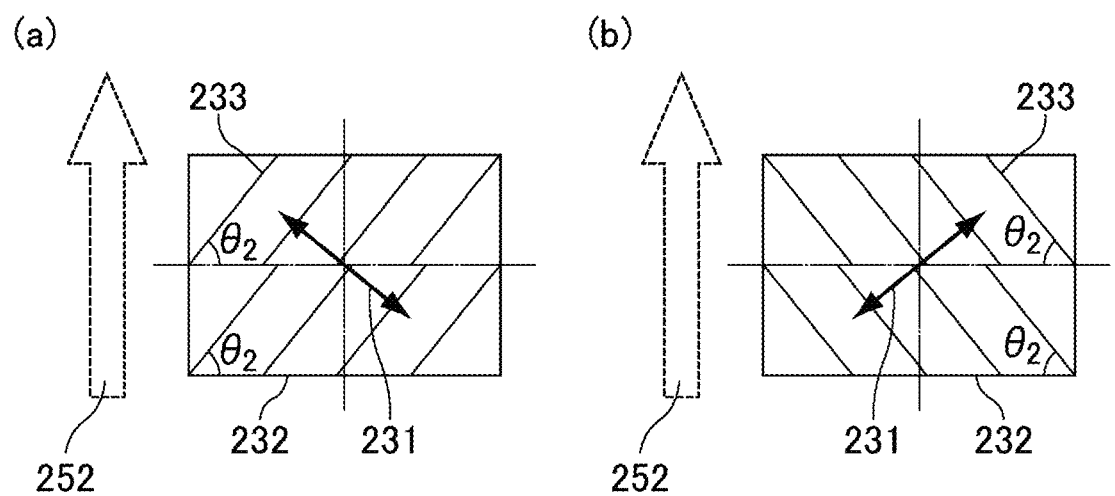
FIG. 9 is an outline view illustrating alignment process in a case of using a wire grid polarizer.

FIG. 9 is an outline view illustrating alignment process in a case of using a wire grid polarizer. (a) of FIG. 9 illustrates a case where the liquid crystal molecules are aligned at an angle of −45° with respect to a light irradiation direction, and (b) of FIG. 9 illustrates a case where the liquid crystal molecules are aligned at an angle of +45° with respect to the photo-irradiation direction. As illustrated in (a) and (b) of FIG. 9, when the polarizer 230 is a wire grid polarizer 232, a polarization axis 231 is a direction orthogonal to extension directions of metal thin wires (wire grid) 233. When the wire grid polarizer 232 overlaps with the liquid crystal display panel substrate and photo-irradiation is performed, the liquid crystal molecules are aligned in the azimuthal direction orthogonal to the extension directions of the metal thin wires 233. Thus, as illustrated in (a) and (b) of FIG. 9, the wire grid polarizer 232 is arranged, and thus the extension directions of the metal thin wires 233 form an angle θ2. Then alignment process is formed. With this, the liquid crystal molecules can be aligned in the desired azimuthal directions. Note that the angle θ2 is an angle obtained after the polarization axis is adjusted to have a desired angle with the rotation adjustment mechanism 260 described later, and is an angle adjusted to have the pre-tilt azimuthal directions of the liquid crystal molecules 41 at an angle of 45° with respect to a traveling direction of the substrate (incident direction).

Examples of the polarizing beam splitter include a cube type and a plate type, for example. Examples of the cube type PBS include one in which inclined surfaces of two prisms are joined and an optical thin film is attached to one of the inclined surfaces with vapor deposition, for example.

The polarizer 230 may be arranged vertically with respect to a photo-irradiation axis. In a case where the polarizer 230 is not arranged vertically with respect to the photo-irradiation axis, alignment of the liquid crystal molecules may be affected in some cases due to a waveguiding effect in the polarizer 230 and the like. The photo-irradiation axis indicates a traveling direction of the light 221 emitted from the light source 220 to the liquid crystal display panel substrate. The expression "the polarizer is arranged vertically with respect to the photo-irradiation axis" indicates that arrangement is performed to obtain light emitted to the liquid crystal display panel substrate in the normal line direction of the polarizer. The term "vertical" indicates an angle formed by the normal line of the polarizer and the photo-irradiation axis, which falls within a range less than 0.5°.

A wavelength selection filter 235 may be provided between the light source 220 and the polarizer 230. A main wavelength of the light emitted through the wavelength selection filter 235 may be from 280 to 400 nm. When the selected wavelength is from 280 to 400 nm, a structural change is caused in the material having a photo-alignment property, which forms the vertical alignment film formed on the surface of the liquid crystal display panel substrate, and an alignment regulating force can be exerted. Intensity of the light emitted from the light source may be from 10 mJ/cm² to 100 mJ/cm².

The wavelength selection filter 235 is not particularly limited, and a wavelength selection filter that is usually used in a field of the photo-alignment processing device may be used. Examples of the wavelength selection filter 235 include a filter in which material for absorbing light with wavelengths other than a transmissive wavelength are dispersed in the filter, a filter having a surface coated with material reflecting light with wavelengths other than the transmissive wavelength, and the like.

The photo-irradiation angle with respect to the liquid crystal display panel substrate may be from 30° to 60°. The irradiation angle is indicated with an angle θ1 in FIG. 8, and is an angle formed between the plane of the liquid crystal display panel substrate and the photo-irradiation axis when the surface of the liquid crystal display panel substrate is set to an angle of 0° and the normal line of the liquid crystal display panel substrate is set to an angle of 90°.

An extinction ratio of the polarizer may be from 50:1 to 500:1. The extinction ratio is expressed with Tmax:Tmin where Tmax indicates a maximum transmittance in a case of irradiating the polarizer with light and Tmin indicates a minimum transmittance in a case of rotating the polarizer by an angle of 90°. As the extinction ratio (a value of Tmax when Tmin is 1) is higher, light in a desired polarization axis direction can be extracted. Thus, variation in the tilt azimuthal directions of the liquid crystal molecules can be reduced.

The rotation adjustment mechanism 260 rotates the polarization axis 231 of the polarizer 230, and adjusts an exposure direction 253 on the liquid crystal display panel substrate plane to an angle of approximately 45° with respect to the photo-irradiation direction 252. The exposure direction 253 is set to an angle of approximately 45° with respect to the photo-irradiation direction 252, and thus the liquid crystal display panel substrate can be subjected to photo-alignment process with scanning exposure excellent in productivity while a movement direction 251 of the liquid crystal display panel substrate and the photo-irradiation direction 252 remain parallel to each other. As illustrated in FIG. 8, the photo-irradiation direction 252 is a traveling direction of the light in a case where the light 221 emitted from the light source 220 is projected on the liquid crystal display panel substrate plane. The exposure direction 253 indicates an oscillation direction of the polarized light emitted from the light source 220 to the liquid crystal display panel substrate plane through the polarizer 230. The exposure direction 253 determines the pre-tilt azimuthal direction applied to the liquid crystal molecules by the vertical alignment film formed on the surface of the liquid crystal display panel substrate.

Adjustment of the polarization axis 231 with the rotation adjustment mechanism 260 is performed by, for example, the following method. First, the polarizer 230 is set, and thus the polarization axis 231 is at an angle of 45° with respect to the photo-irradiation direction 252. The direction of the polarization axis before adjustment with the rotation adjustment mechanism is also referred to as a "45° azimuthal direction". Next, the rotation adjustment mechanism 260 rotates the polarizer 230 from the 45° azimuthal direction, and adjusts the azimuthal direction of the polarization axis 231, based on data calculated by geometric computation in consideration of the photo-irradiation angle with respect to the liquid crystal display panel substrate, a refractive index of the alignment film material, and the like. With the rotation adjustment mechanism 260, the azimuthal direction of the polarization axis of the polarizer with respect to the photo-irradiation direction and the exposure direction on the substrate surface can match with each other, and thus the tilt azimuthal directions of the liquid crystal molecules in the liquid crystal display panel can be set to the desired angles.

The rotation adjustment mechanism 260 may rotate the polarization axis of the polarizer 230 from the 45° azimuthal direction within a range of from −15° to +15°. The rotation adjustment mechanism rotates the polarization axis within the range of from −15° to +15°. With this, even when the photo-irradiation angle with respect to the liquid crystal display panel substrate is changed, the tilt azimuthal directions of the liquid crystal molecules can be set to the desired angles by adjusting the exposure direction 253. It is preferred that the liquid crystal molecules have the pre-tilt azimuthal directions at the time when no voltage is applied to the liquid crystal layer 40, which is adjusted to an angle of 45° with respect to the traveling direction of the substrate (incident direction).

The photo-alignment processing device 200 may further include a rotation mechanism 264. The rotation mechanism 264 is capable of rotating the polarization axis 231 of the polarizer 230 from the 45° azimuthal direction by any selected one of an angle of approximately 45° and an angle of approximately 90°. In a case where an azimuthal direction obtained with clockwise rotation by an angle of 45° with respect to the photo-irradiation direction 252 is indicated with the +45° azimuthal direction, when the polarization axis 231 of the polarizer 230 is rotated from the +45° azimuthal direction by an angle of 90°, the polarization axis 231 after rotation is the −45° azimuthal direction with respect to the photo-irradiation direction. The polarization axis 231 is rotated from the +45° azimuthal direction by an angle of 90°, and is further adjusted by the rotation adjustment mechanism 260. With this, before and after the rotation, photo-irradiation can be performed while the exposure direction 253 remains at an angle of approximately 45° with respect to the photo-irradiation direction 252. Thus, the present embodiment is preferable for manufacturing of the liquid crystal display panel with a new alignment control mode in which the four alignment regions with the different tilt azimuthal directions of the liquid crystal molecules are arranged along the longitudinal direction of the pixel, as illustrated in FIG. 2. Further, the liquid crystal display panel with the new alignment control mode can be manufactured with scanning exposure. Thus, production efficiency can be greatly improved. The expression "from the 45° azimuthal direction by an angle of approximately 45° or an angle of approximately 90°" indicates a range forming an angle of 15° clockwise or counterclockwise from the angle of 45° or the angle of 90° with respect to the 45° azimuthal direction. The 45° azimuthal direction and the 90° azimuthal direction indicate ranges of ±0.5° from the angle of 45° and the angle of 90°, respectively.

The rotation mechanism 264 is also capable of rotating the polarization axis 231 of the polarizer 230 from the 45° azimuthal direction by an angle of approximately 45°. When the polarization axis 231 is rotated from the 45° azimuthal direction by the angle of 45°, the polarization axis 231 after the rotation is parallel to the photo-irradiation direction. Thus, the known photo-alignment process in which the polarization axis of the polarizer and the photo-irradiation direction match with each other can also be performed.

The stage 250 is a stage on which the liquid crystal display panel substrate is placed. The liquid crystal display panel substrate is fixed on the stage 250, and is irradiated with light while moving the liquid crystal display panel substrate or moving the light source with respect to the liquid crystal display panel substrate. With such scanning exposure, photo-alignment process can be performed efficiently. The photo-irradiation direction with respect to the liquid crystal display panel substrate, and the movement direction of the liquid crystal display panel substrate or the movement direction of the light source 220 are parallel to each other. Thus, within a photo-irradiation area of one light source, the angle of the light entering the substrate from the light source is substantially constant. That is, the angle being a pre-tilt angle (polar angle) applied to the liquid crystal molecules is substantially constant. Thus, variation in the pre-tilt angle in the photo-irradiation area can be suppressed, and the liquid crystal display panel excellent in display quality can be manufactured. The photo-alignment processing device 200 may include a stage scanning mechanism that moves the stage 250 and/or a light source scanning mechanism that moves the light source 220. The term "parallel" indicates that an angle formed between the photo-irradiation direction, and the movement direction of the liquid crystal display panel substrate or the movement direction of the light source 220 falls within a range of less than 5°. The movement direction 251 of the liquid crystal display panel substrate may be the direction illustrated in FIG. 8, or may be a direction different from the direction illustrated in FIG. 8 by an angle of 180°.

The photo-alignment processing device 200 may include the light blocking member 240 and the like in addition to the above-mentioned mechanisms. While the light blocking member 240 blocks light from a part not subjected to photo-irradiation, photo-alignment process is performed. With this, alignment division treatment can be performed.

In a case where the photo-alignment processing device is used, the azimuthal direction of the polarization axis of the polarizer with respect to the photo-irradiation direction and the exposure direction on the liquid crystal display panel substrate plane can match with each other, and the tilt azimuthal directions of the liquid crystal molecules 41 in the liquid crystal display panel 100 can be set to the desired angles.

Next, description is made on one example of a method for manufacturing the liquid crystal display panel 100 according to the present embodiment. The method for manufacturing the liquid crystal display panel 100 according to the present embodiment is not particularly limited, and a method that is usually used in a field of the liquid crystal display panel may be used.

According to yet another aspect of the disclosure, a method for manufacturing the liquid crystal display panel according to the disclosure includes forming a vertical alignment film on any one of the first substrate and the second substrate, wherein, the forming a vertical alignment film is a step in which a coating film is formed by applying, on any one of the first substrate and the second substrate, an alignment film composition containing a material having a photo-alignment property, and alignment process is performed such that the coating film is irradiated with light from a light source, and the alignment process is performed at a plurality of scanning steps such that four alignment regions where exposure directions on the coating film differ from each other and form an angle of approximately 45° with respect to the first direction are formed along the first direction.

During the vertical alignment film formation, the vertical alignment film is formed on the substrate of any one of the first substrate and the second substrate. The vertical alignment film is preferably formed also on the other substrate. However, in a case where the vertical alignment film formed on the first substrate is used as a first vertical alignment film and the vertical alignment film formed on the second substrate is used as a second vertical alignment film, it is preferred that only the vertical alignment film of any one of the first vertical alignment film and the second vertical alignment film be subjected to alignment process described above and that the vertical alignment film of the other film be prevented from being subjected to alignment process described above.

Alignment process with respect to any one of the first vertical alignment film and the second vertical alignment film is performed with photo-alignment process, which is irradiation with light (electromagnetic waves) such as ultraviolet light and visible light. The light used for photo-alignment process is polarized light. During photo-alignment process described above, any one of the substrates described above may be irradiated with light in an oblique direction.

During the scanning, photo-irradiation may be performed while moving any one of the substrates described above or moving the light source with respect to any one of the substrates described above. That is, scanning exposure may be performed. For the scanning, for example, the light source that irradiates any one of the first vertical alignment film and the second vertical alignment film with light is provided, and a device having a function of performing continuous scanning exposure for the plurality of pixels can be used.

Specific aspects of scanning exposure include an aspect in which the substrate surface is irradiated with a light beam emitted from the light source while moving the substrate, an aspect in which the substrate surface is irradiated with a light beam emitted from the light source while moving the light source, and an aspect in which the substrate surface is irradiated with a light beam emitted from the light source while moving the light source and the substrate, for example.

The scanning includes first scanning in which the movement direction of any one of the substrates described above is a second direction and the photo-irradiation direction from the light source is a third direction. The second direction and the third direction are parallel to each other, and may be reverse directions. The scanning may further include second scanning in which the movement direction of any one of the substrates described above is the second direction and the photo-irradiation direction from the light source is the second direction. The scanning may further include third scanning in which the movement direction of any one of the substrates described above is the third direction and the photo-irradiation direction from the light source is the third direction.

During the scanning, any one of the substrates described above may be rotated. By rotating any one of the substrates described above, the region corresponding to the first domain to the fourth domain can be subjected to alignment process without changing the photo-irradiation direction from the light source and the movement direction of any one of the substrates described above. Even in a narrow space, the region corresponding to the first domain to the fourth domain can be subjected to alignment process. Meanwhile, a method with non-rotation of any one of the substrates described above is advantageous in a view of throughput (processing capacity).

With reference to FIG. 10 to FIG. 13, examples of alignment process through use of the photo-alignment processing device 200 are given below. FIG. 10 to FIG. 13 are views illustrating a first example to a fourth example of alignment process through use of the photo-alignment processing device, respectively. In FIG. 10 to FIG. 13, for describing the orientation of the liquid crystal display panel substrate, a cutout part is given at one corner. The actual liquid crystal display panel substrate is not required to have a cutout part. The movement direction 251 of the liquid crystal display panel substrate described in the first example to the fourth example given below may be different from by the azimuthal directions illustrated in FIG. 10 to FIG. 13 by an angle of 180°, respectively.

In the first example to the fourth example given below, a case where the second vertical alignment film formed on the second substrate is subjected to alignment process. However, the first vertical alignment film formed on the first substrate may be subjected to alignment process. When the second vertical alignment film is subjected to alignment process as in the first example or the third example given below, the liquid crystal display panel including the domains with the alignment vectors as illustrated in FIG. 2 and the like can be produced. When the second vertical alignment film is subjected to alignment process as in the second example or the fourth example given below, the liquid crystal display panel including the domains with the alignment vectors as illustrated in (b) of FIG. 4 can be produced.

With the first example and the second example of alignment process, description is given on a method of rotating the liquid crystal display panel substrate during the scanning. In the first example of alignment process, as illustrated in (a) of FIG. 10, first, a region corresponding to the fourth domain 10*d* is subjected to first photo-irradiation. During the first photo-irradiation, the movement direction 251 of the liquid crystal display panel substrate is the second direction, and the photo-irradiation direction 252 is the third direction. the above-mentioned photo-irradiation mechanism 280 is used to perform photo-irradiation through the wavelength selection filter 235 (not illustrated) and the polarizer 230. The second direction and the third direction are parallel to each other, and is different from each other by an angle of 180°. The regions that are not subjected to photo-irradiation are blocked by the light blocking member 240. The polarization axis 231 of the polarizer 230 is set to the −45° azimuthal direction with respect to the photo-irradiation direction 252. Then, the rotation adjustment mechanism 260 (not illustrated) adjusts the exposure direction 253 on the liquid crystal display panel substrate plane to have an angle of approximately −45° with respect to the photo-irradiation direction 252. After that, irradiation is performed with the light 221, and the first photo-irradiation is performed.

Subsequently, as illustrated in (b) of FIG. 10, a region corresponding to the first domain 10*a* is subjected to second photo-irradiation. During the second photo-irradiation, the light blocking member 240 is moved, the movement direction 251 of the liquid crystal display panel substrate is the second direction, and the photo-irradiation direction 252 is the third direction. Under this state, the rotation mechanism 264 rotates the polarization axis 231 of the polarizer 230 from the −45° azimuthal direction by an angle of 90° to the +45° azimuthal direction with respect to the photo-irradiation direction 252. Then, the rotation adjustment mechanism 260 adjusts the polarization axis 231 to perform the second photo-irradiation.

Figure 10:
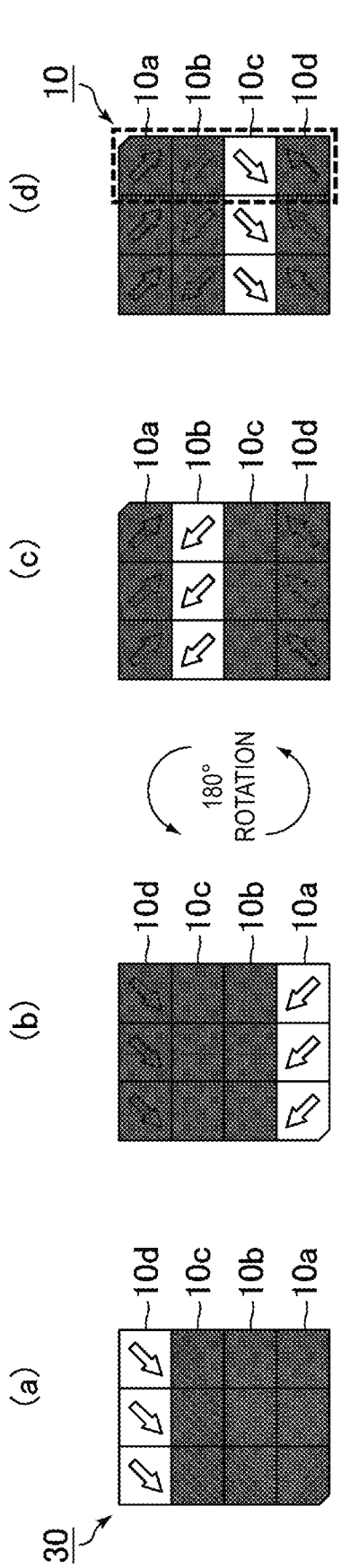
FIG. 10 is a view illustrating a first example of alignment process using the photo-alignment processing device.
Figure 10:
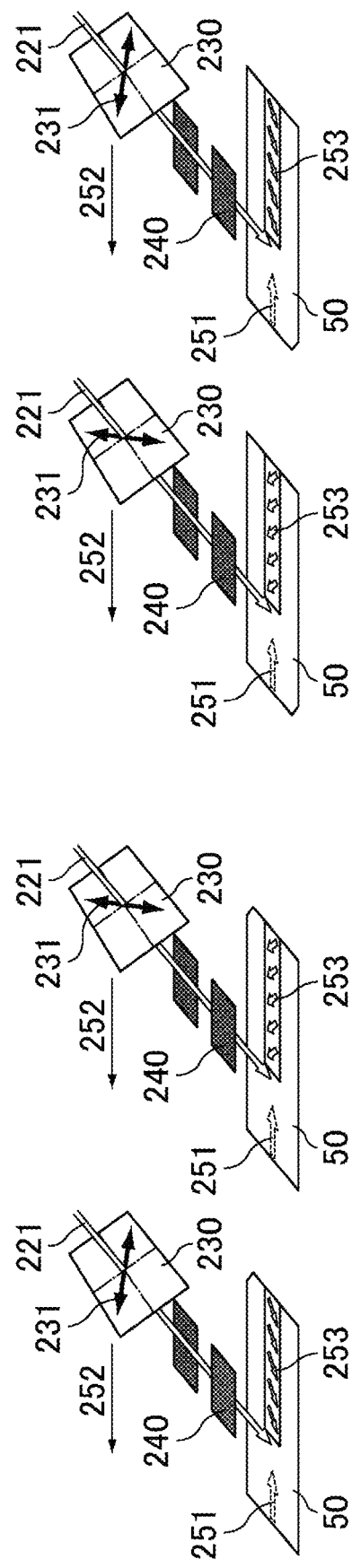

After that, the liquid crystal display panel substrate is rotated by an angle of 180°, and as illustrated in (c) of FIG. 10, a region corresponding to the second domain 10b is subjected to third photo-irradiation. During the third photo-irradiation, the light blocking member 240 is moved, the movement direction 251 of the liquid crystal display panel substrate is the second direction, and the photo-irradiation direction 252 is the third direction. Under this state, the third photo-irradiation is performed without changing the polarization axis 231 of the polarizer 230.

Finally, as illustrated in (d) of FIG. 10, a region corresponding to the third domain 10c is subjected to fourth photo-irradiation. During the fourth photo-irradiation, the light blocking member 240 is moved, the movement direction 251 of the liquid crystal display panel substrate is the second direction, and the photo-irradiation direction 252 is the third direction. Under this state, the rotation mechanism 264 rotates the polarization axis 231 of the polarizer 230 from the +45° azimuthal direction by an angle of 90° to the −45° azimuthal direction with respect to the photo-irradiation direction 252. Then, the rotation adjustment mechanism 260 adjusts the polarization axis 231 to perform the fourth photo-irradiation.

A part surrounded by the dotted line in (d) of FIG. 10 is a region corresponding to one pixel. In the liquid crystal display panel substrate subjected to alignment process during the photo-irradiation in the first example, the regions corresponding to the four alignment regions formed in one pixel have the exposure directions 253 different from one another. Specifically, the four alignment regions, which have different exposure directions on the coating films and form an angle of approximately 45° with respect to the first direction of the display unit, are formed along the first direction. In all the first photo-irradiation to the fourth photo-irradiation, the polarization axis 231 is preferably adjusted by the rotation adjustment mechanism 260 so that the exposure direction 253 on the liquid crystal display panel substrate plane is at an angle of approximately 45° with respect to the photo-irradiation direction 252. Note that the angle of approximately 45° indicates a range of 45°±3° with respect to the first direction of the display unit.

Figure 11:
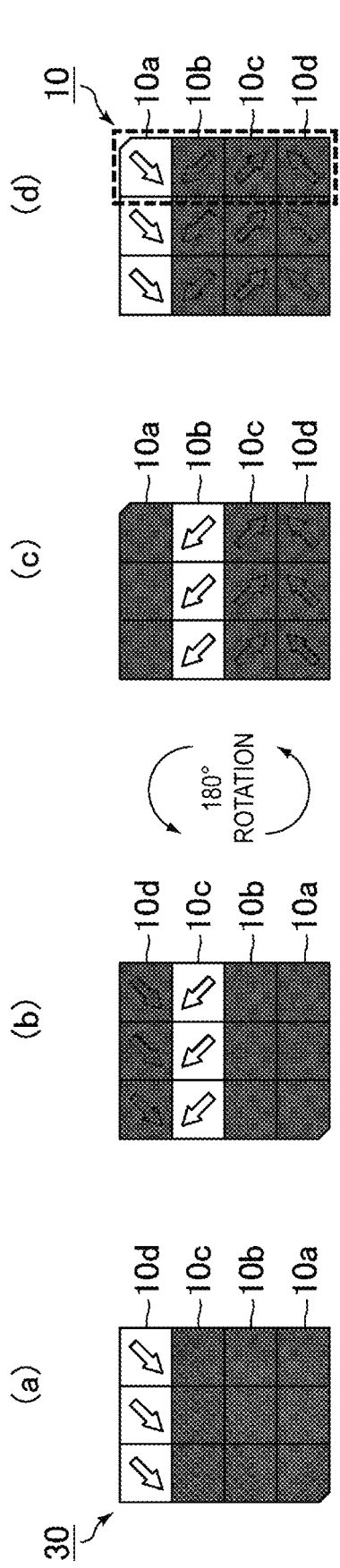
FIG. 11 is a view illustrating a second example of alignment process using the photo-alignment processing device.
Figure 11:
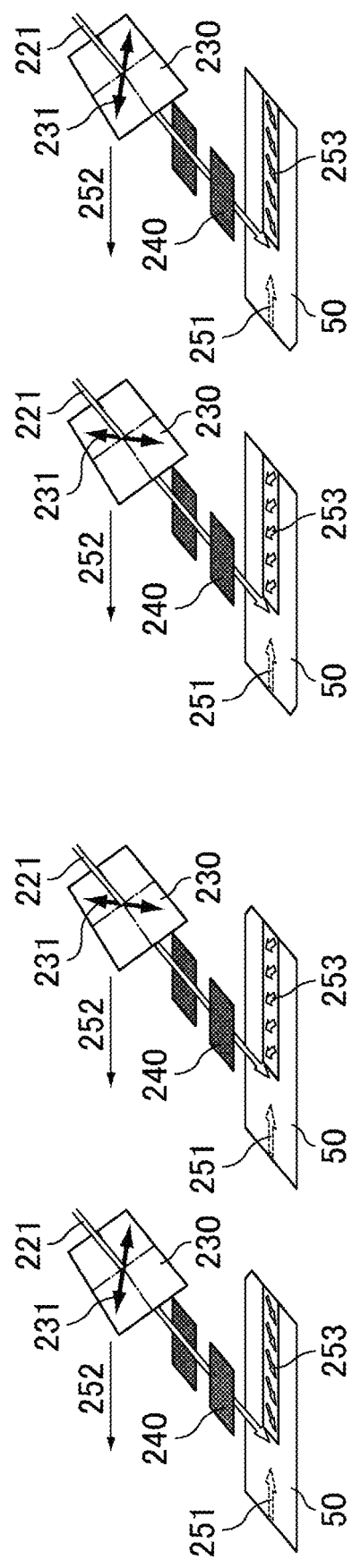

The order of subjecting the regions corresponding to the first domain to the fourth domain to alignment process is not particularly limited. For example, in the second example of alignment process, as illustrated in (a) of FIG. 11, the region corresponding to the fourth domain 10d is subjected to the first photo-irradiation, and as illustrated in (b) of FIG. 11, the region corresponding to the third domain 10c is subjected to the second photo-irradiation. After that, the liquid crystal display panel substrate is rotated by an angle of 180°, and as illustrated in (c) of FIG. 11, the region corresponding to the second domain 10b is subjected to the third photo-irradiation. Then, as illustrated in (d) of FIG. 11, the region corresponding to the first domain 10a is subjected to the fourth photo-irradiation. In the second example, alignment process is performed similarly in the first example except for the point that the order of performing alignment process is different. A part surrounded by the dotted line in (d) of FIG. 11 is a region corresponding to one pixel. As illustrated in (d) of FIG. 11, by switching the order of performing alignment process described above, the exposure directions in the regions corresponding to the first domain to the fourth domain can be different from those in the first example.

With the third example and the fourth example of alignment process, description is given on a method of not rotating the liquid crystal display panel substrate during the scanning. In the third example of alignment process, as illustrated in (a) of FIG. 12, first, the region corresponding to the fourth domain 10d is subjected to the first photo-irradiation. During the first photo-irradiation, photo-irradiation is performed with the movement direction 251 of the liquid crystal display panel substrate as the second direction and the photo-irradiation direction 252 as the third direction. The polarization axis 231 of the polarizer 230 is set to the −45° azimuthal direction with respect to the photo-irradiation direction 252. Then, the rotation adjustment mechanism 260 (not illustrated) adjusts the exposure direction 253 on the liquid crystal display panel substrate plane to have an angle of approximately 45° with respect to the photo-irradiation direction 252. After that, irradiation is performed with the light 221, and the first photo-irradiation is performed.

Subsequently, as illustrated in (b) of FIG. 12, the region corresponding to the first domain 10a is subjected to the second photo-irradiation. During the second photo-irradiation, the light blocking member 240 is moved, the movement direction 251 of the liquid crystal display panel substrate is the second direction, and the photo-irradiation direction 252 is the third direction. Under this state, the rotation mechanism 264 rotates the polarization axis 231 of the polarizer 230 from the −45° azimuthal direction by an angle of 90° to the +45° azimuthal direction with respect to the photo-irradiation direction 252. Then, the rotation adjustment mechanism 260 adjusts the polarization axis 231 to perform the second photo-irradiation.

Figure 12:
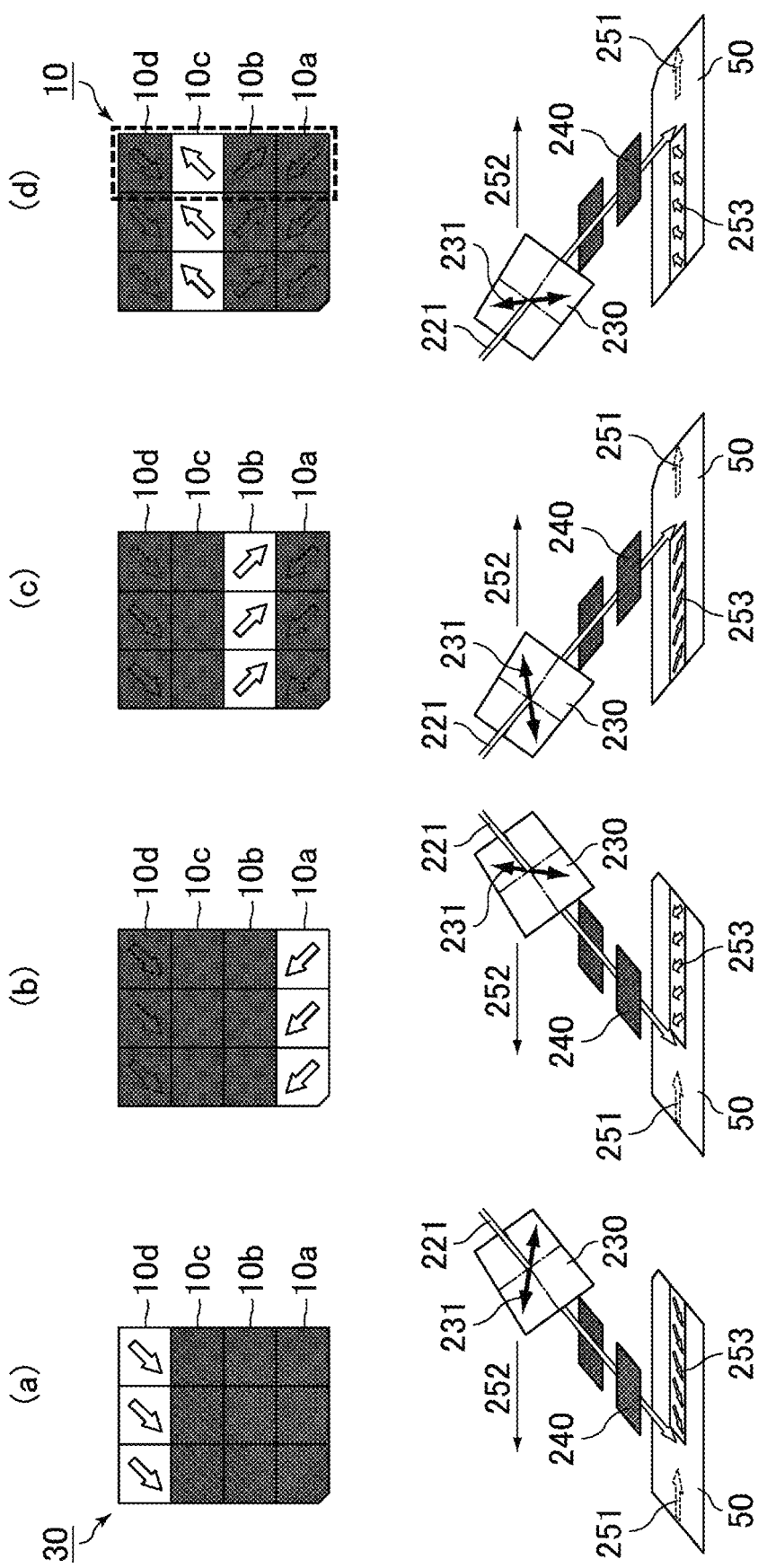
FIG. 12 is a view illustrating a third example of alignment process using the photo-alignment processing device.

Further, as illustrated in (c) of FIG. 12, the region corresponding to the second domain 10b is subjected to the third photo-irradiation. During the third photo-irradiation, the light blocking member 240 is moved, the movement direction 251 of the liquid crystal display panel substrate and the photo-irradiation direction 252 are the second direction, and the third photo-irradiation is performed without changing the polarization axis 231 of the polarizer 230.

Finally, as illustrated in (d) of FIG. 12, the region corresponding to the third domain 10c is subjected to the fourth photo-irradiation. During the fourth photo-irradiation, the light blocking member 240 is moved, and the movement direction 251 of the liquid crystal display panel substrate and the photo-irradiation direction 252 are the second direction. Under this state, the rotation mechanism 264 rotates the polarization axis 231 of the polarizer 230 from the +45° azimuthal direction by an angle of 90° to the −45° azimuthal direction with respect to the photo-irradiation direction 252. After that, the rotation adjustment mechanism 260 adjusts polarization axis 231 to perform the fourth photo-irradiation.

A part surrounded by the dotted line in (d) of FIG. 12 is a region corresponding to one pixel. In the liquid crystal display panel substrate subjected to alignment process during the photo-irradiation in the first example, the regions corresponding to the four alignment regions formed in one pixel have the exposure directions 253 different from one another. Specifically, the four alignment regions, which have different exposure directions on the coating films and form an angle of approximately 45° with respect to the first direction of the display unit, are formed along the first direction.

Figure 13:
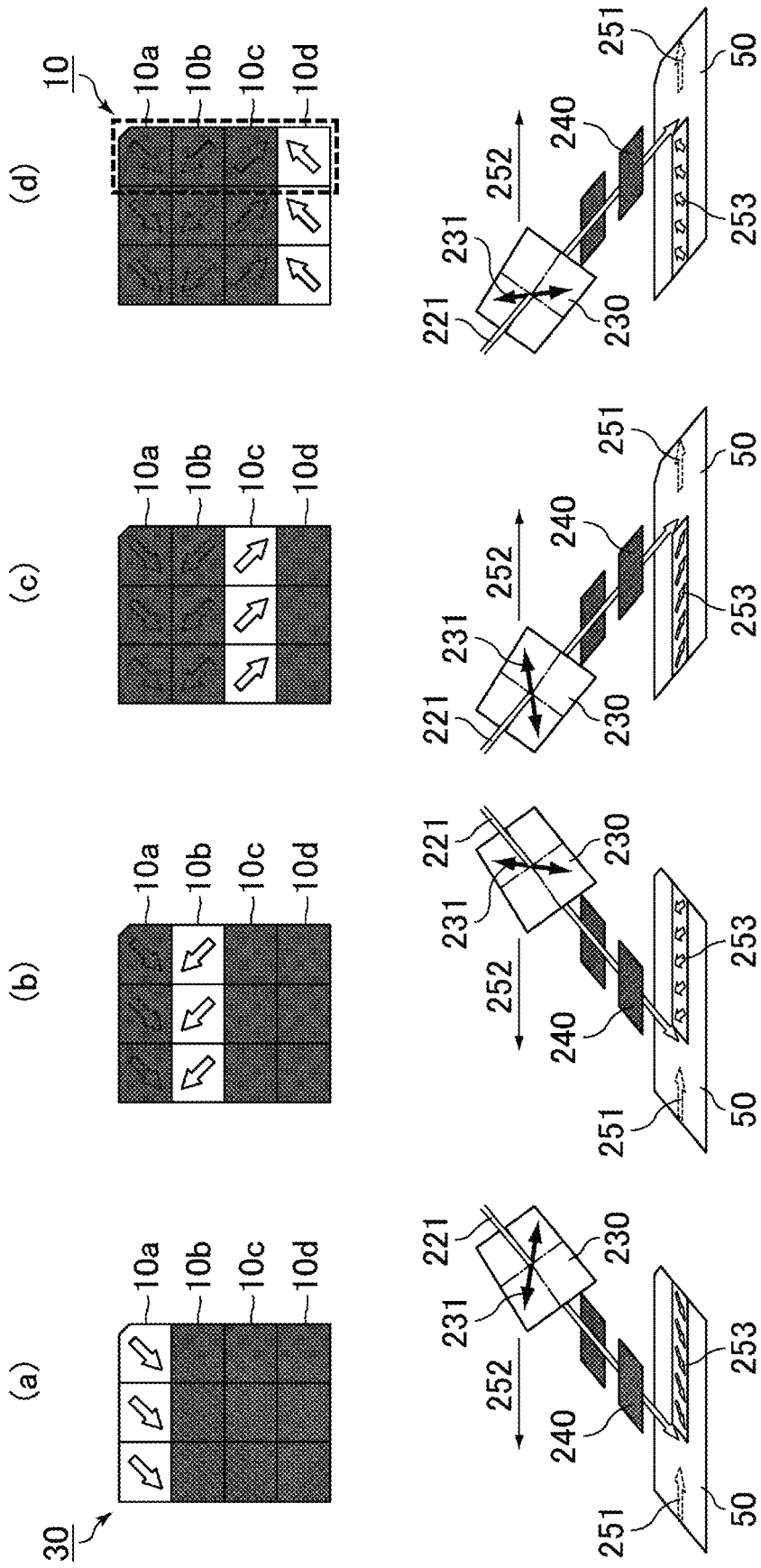
FIG. 13 is a view illustrating a fourth example of alignment process using the photo-alignment processing device.

Even in a case where the liquid crystal display panel substrate is not rotated, the order of subjecting the region corresponding to the first domain to the fourth domain to alignment process is not particularly limited. For example, in the fourth example of alignment process, as illustrated in (a) of FIG. 13, the region corresponding to the first domain 10a is subjected to the first photo-irradiation. As illustrated in (b) of FIG. 13, the region corresponding to the second domain 10b is subjected to the second photo-irradiation, As illustrated in (c) of FIG. 13, the region corresponding to the third domain 10c is subjected to the third photo-irradiation. As illustrated in (d) of FIG. 13, the region corresponding to the fourth domain 10d is subjected to the fourth photo-irradiation. In the fourth example, alignment process is performed similarly in the third example except for the point that the order of performing alignment process is different. A part surrounded by the dotted line in (d) of FIG. 13 is a region corresponding to one pixel. As illustrated in (d) of FIG. 13, by switching the order of performing alignment process described above, the exposure directions in the regions corresponding to the first domain to the fourth domain can be different from those in the third example.

The disclosure is described in more detail below using examples and comparative examples. However, the disclosure is not limited only to these examples.

Example 1

First, as the first substrate, a TFT substrate including a TFT, pixel electrodes, signal lines, and the like on a glass substrate was prepared. As the second substrate, a CF substrate including a black matrix, color filters, counter electrodes, and the like on a glass substrate was prepared. In Example 1, as the pixel electrodes, the pixel electrodes with slits formed therein as illustrated in FIG. 7 were used. As the counter electrodes, the solid electrodes without openings (slits) were used. Subsequently, an alignment film composition was applied on the surface of the TFT substrate, and the coating film was formed. After that, the coating film was heated at a temperature of 80° C. or less, and then was heated at a temperature of 200° C. or 230° C. during final heat treatment. In this manner, the first vertical alignment film was formed. Similarly to the first vertical alignment film, the second vertical alignment film was formed on the surface of the CF substrate. The alignment film composition contained a photo-alignment film material including a cinnamate group as a material having a photo-alignment property.

Subsequently, through use of a photo-alignment processing device including a mechanism that performs irradiation by emitting light from the light source illustrated in FIG. 8 through the polarizer (photo-irradiation mechanism), the CF substrate on which the second vertical alignment film was performed was subjected to alignment process. During alignment process described above, scanning exposure was performed, and irradiation was performed with linearly polarized light having a main wavelength of 313 nm and intensity of 20 mJ/cm². FIG. 14 is a view illustrating alignment process of the CF substrate (second substrate) in Example 1. FIG. 14 illustrates the exposure directions when the CF substrate was observed from the second vertical alignment film side. As illustrated in FIG. 14, the first photo-irradiation to the fourth photo-irradiation were performed, and the four alignment regions, which had the different exposure directions 254 on the coating films and formed an angle of approximately 45° with respect to the first direction of the display unit, were formed along the first direction. The first vertical alignment film was not subjected to alignment process.

Figure 15:
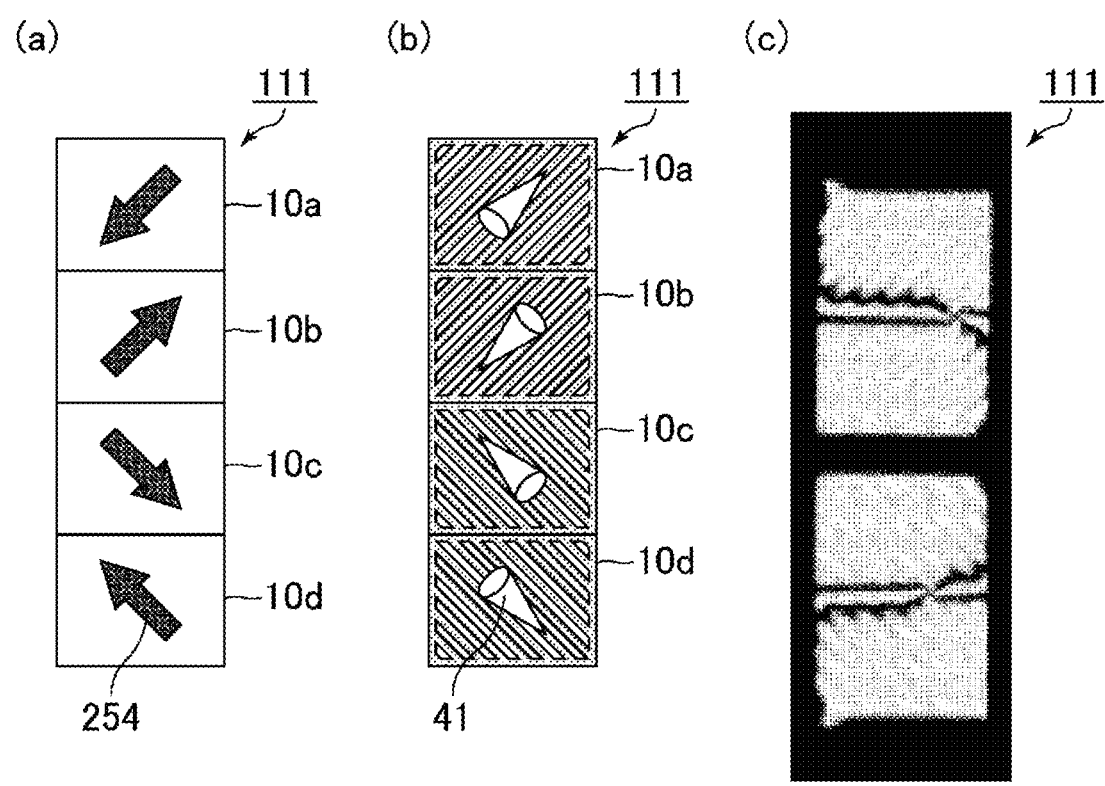
FIG. 15(a) is a view illustrating a state of alignment process in Example 1.
FIG. 15(b) is a schematic plan view illustrating tilt azimuthal directions of liquid crystal molecules in Example 1.
FIG. 15(c) is an enlarged picture of Example 1 at the time of voltage application.

A sealing material was applied to one of the substrates, and a liquid crystal composition containing a negative-working liquid crystal material was dripped down. Then, the substrate was attached to the other substrate to form a liquid crystal layer, and the sealing material was cured. In this manner, a liquid crystal cell 111 in Example 1 was produced. (a) of FIG. 15 is a view illustrating a state of alignment process in Example 1, (b) of FIG. 15 is a schematic plan view illustrating tilt azimuthal directions of liquid crystal molecules in Example 1, and (c) of FIG. 15 is an enlarged picture of Example 1 at the time of voltage application. (a) to (c) of FIG. 15 each illustrate one display unit of the liquid crystal cell 111 in Example 1, and illustrate a case where the liquid crystal cell 111 was observed from the glass substrate side of the CF substrate.

Figure 16:
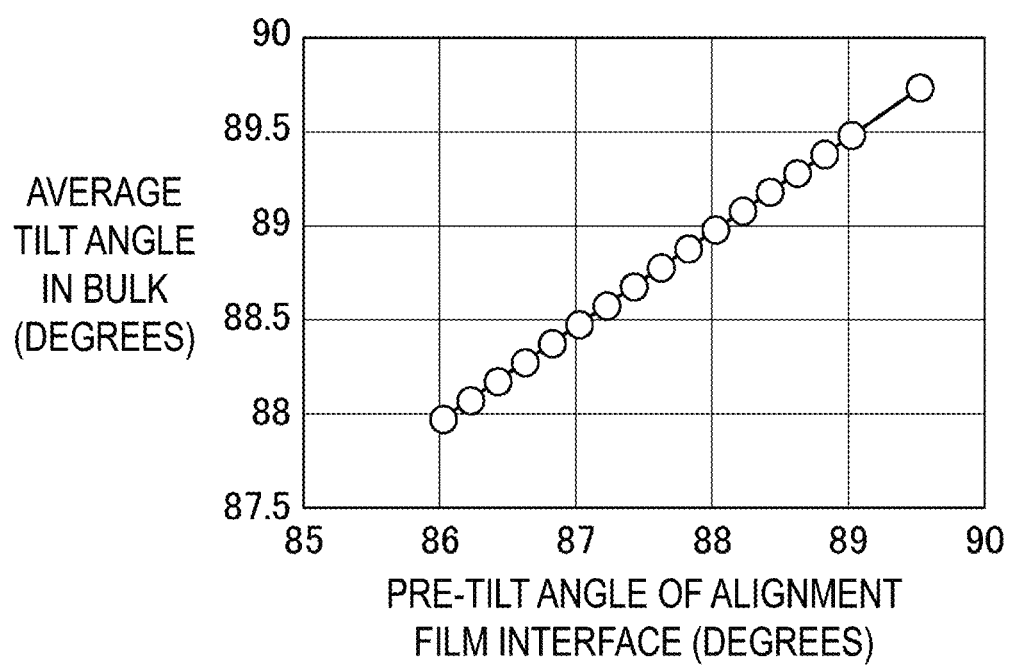
FIG. 16 is a graph illustrating a relationship between an average tilt angle of the liquid crystal molecules in the liquid crystal layer and a pre-tilt angle of the liquid crystal molecules.

Through use of a polarized light analysis device (OP-TIPRO available from SHINTEC Co., Ltd.), the average tilt angle of the liquid crystal molecules in the liquid crystal layer of the liquid crystal cell in Example 1 was measured. The average tilt angle of the liquid crystal cell in Example 1 was 89.4°. FIG. 16 is a graph illustrating a relationship between the average tilt angle of the liquid crystal molecules in the liquid crystal layer and the pre-tilt angle of the liquid crystal molecules. From FIG. 16, it was found out that the pre-tilt angle of the liquid crystal molecules with respect to the second vertical film was approximately 89°.

Example 2

In Example 2, a liquid crystal cell in Example 2 was produced similarly in Example 1 except for using solid electrodes without openings (slits) as pixel electrodes as illustrated in FIG. 6. The average tilt angle of the liquid crystal cell in Example 2 was 89.4°. From FIG. 16, it was found out that the pre-tilt angle of the liquid crystal molecules with respect to the second vertical film was approximately 89°.

Example 3

Figure 18:
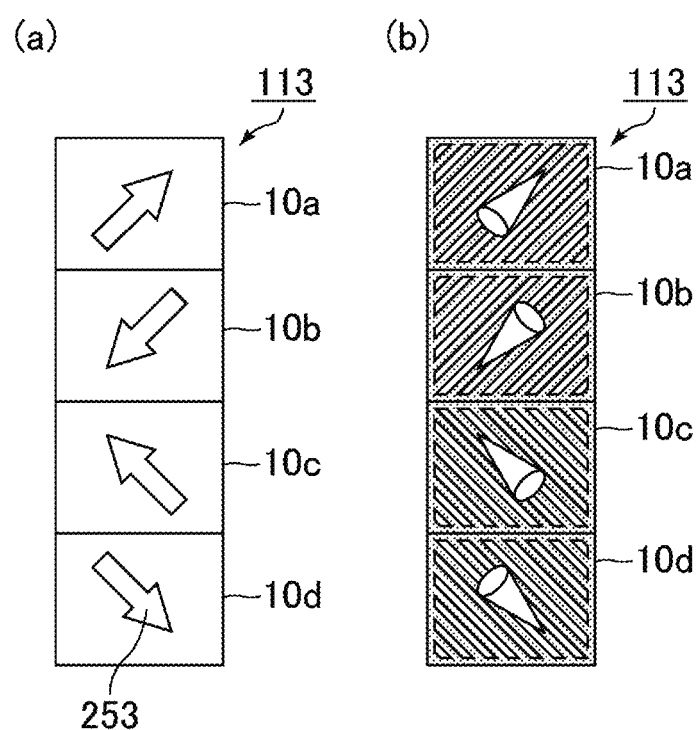
FIG. 18(a) is a view illustrating a state of alignment process in Example 3.
FIG. 18(b) is a schematic plan view illustrating tilt azimuthal directions of liquid crystal molecules in Example 3.

In Example 3, a liquid crystal cell 113 in Example 3 was produced similarly in Example 1 except for subjecting the first vertical alignment film formed on the TFT side to alignment process and not subjecting the second vertical alignment film formed on the CF substrate side to alignment process. FIG. 17 is a view illustrating alignment process of the TFT substrate (first substrate) in Example 3. FIG. 17 illustrates the exposure directions when the TFT substrate was observed from the first vertical alignment film side. As illustrated in FIG. 17, in Example 3, the TFT substrate was subjected to alignment process through use of the same device under the same conditions as in Example 1 when the CF substrate was subjected to alignment process. (a) of FIG. 18 is a view illustrating a state of alignment process in Example 3, and (b) of FIG. 18 is a schematic plan view illustrating tilt azimuthal directions of liquid crystal molecules in Example 3. (a) and (b) of FIG. 18 each illustrate one display unit of the liquid crystal cell 113 in Example 3, and illustrate a case where the liquid crystal cell 113 was observed from the glass substrate side of the CF substrate. The average tilt angle of the liquid crystal cell in Example 3 was 89.4°. From FIG. 16, it was found out that the pre-tilt angle of the liquid crystal molecules with respect to the first vertical film was approximately 89°.

Comparative Example 1

First, similarly to Example 1, the first vertical alignment film was formed on the surface of the TFT substrate, and the second vertical alignment film was formed on the CF substrate. In Comparative Example 1, through use of an alignment processing device similar to that in Example 1, both the first vertical alignment film and the second vertical alignment film were subjected to alignment process. (a) of FIG. 19 is a view illustrating alignment process of the TFT substrate (first substrate) in Comparative Example 1, and (b) of FIG. 19 is a view illustrating alignment process of the CF substrate (second substrate) in Comparative Example 1. FIG. 19(*a*) illustrates the exposure directions in a case where the TFT substrate was observed from the first vertical alignment film side, and FIG. 19(*b*) illustrates the exposure directions in a case where the CF substrate was observed from the second vertical alignment film side.

Figure 20:
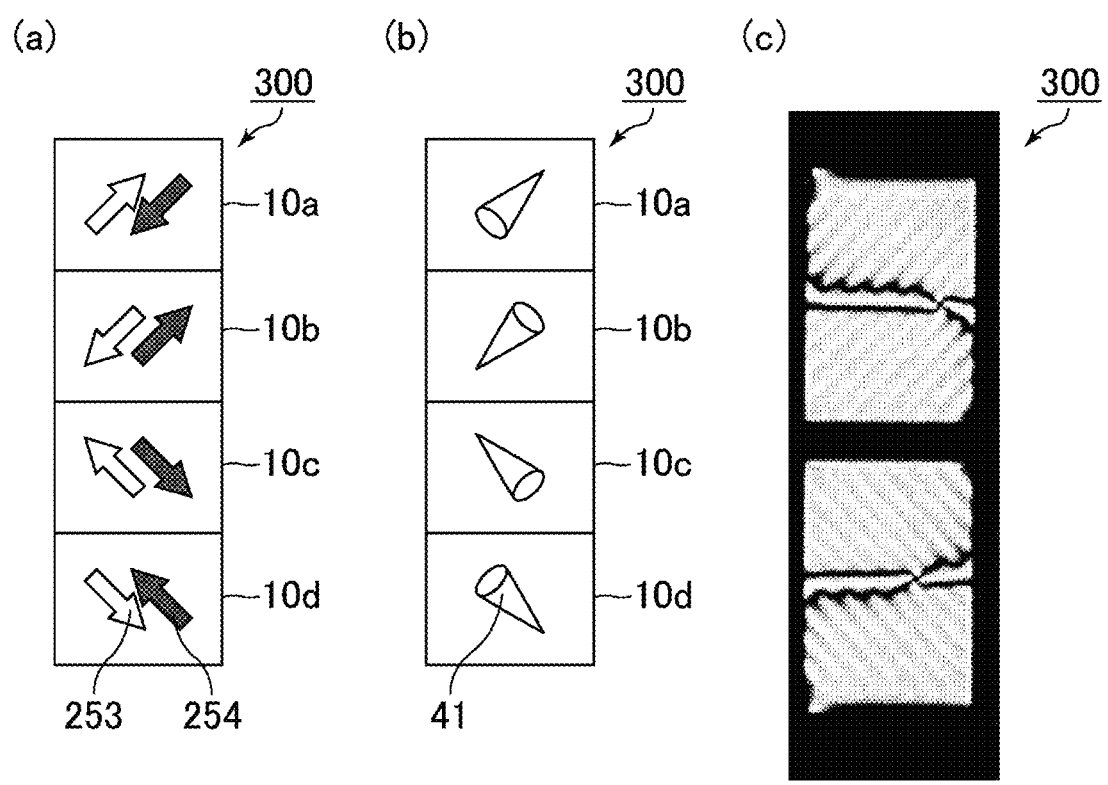
FIG. 20(a) is a view illustrating a state of alignment process in Comparative Example 1.
FIG. 20(b) is a schematic plan view illustrating tilt azimuthal directions of liquid crystal molecules in Comparative Example 1.
FIG. 20(c) is an enlarged picture of Comparative Example 1 at the time of voltage application.

Similarly in Example 1, the TFT substrate and the CF substrate that were subjected to alignment process described above were used to produce a liquid crystal cell 300 in Comparative Example 1. (a) of FIG. 20 is a view illustrating a state of alignment process in Comparative Example 1, (b) of FIG. 20 is a schematic plan view illustrating tilt azimuthal directions of liquid crystal molecules in Comparative Example 1, and (c) of FIG. 20 is an enlarged picture of Comparative Example 1 at the time of voltage application. (a) to (c) of FIG. 20 each illustrate one display unit of the liquid crystal cell 300 in Comparative Example 1, and illustrate a case where the liquid crystal cell 300 was observed from the glass substrate side of the CF substrate. The average tilt angle of the liquid crystal cell in Comparative Example 1 was 88.9°. From FIG. 16, it was found out that the pre-tilt angles of the liquid crystal molecules with respect to the first vertical film and the second vertical film were approximately 88°.

Comparative Example 2

Figure 21:
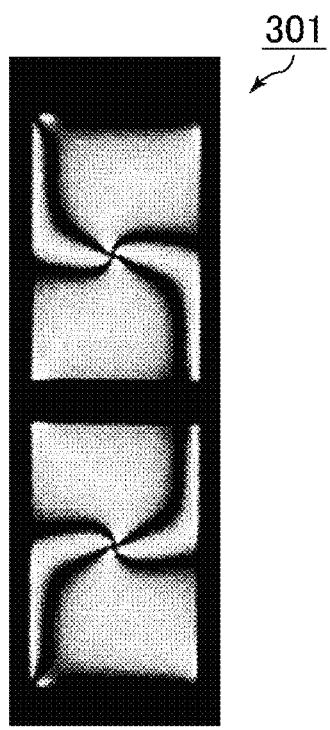
FIG. 21 is a picture of one pixel in Comparative Example 2 at the time of voltage application.

In Comparative Example 2, a liquid crystal cell 301 in Comparative Example 2 was produced similarly in Comparative Example 1 except for using solid electrodes without openings (slits) as pixel electrodes as illustrated in FIG. 6. The average tilt angle of the liquid crystal cell in Comparative Example 2 was 88.9°. From FIG. 16, the pre-tilt angle of the liquid crystal molecules with respect to the first vertical film and the second vertical film were both approximately 88°. FIG. 21 is a picture of one pixel in Comparative Example 2 at the time of voltage application.

Comparative Example 3

In Comparative Example 3, a liquid crystal cell in a 4D-RTN mode in which one pixel was divided into eight domains and aligned was produced. In Comparative Example 3, a TFT substrate including solid electrodes without openings (slits) as pixel electrodes and a CF substrate including solid electrodes without openings as common electrodes were used.

Figure 22:
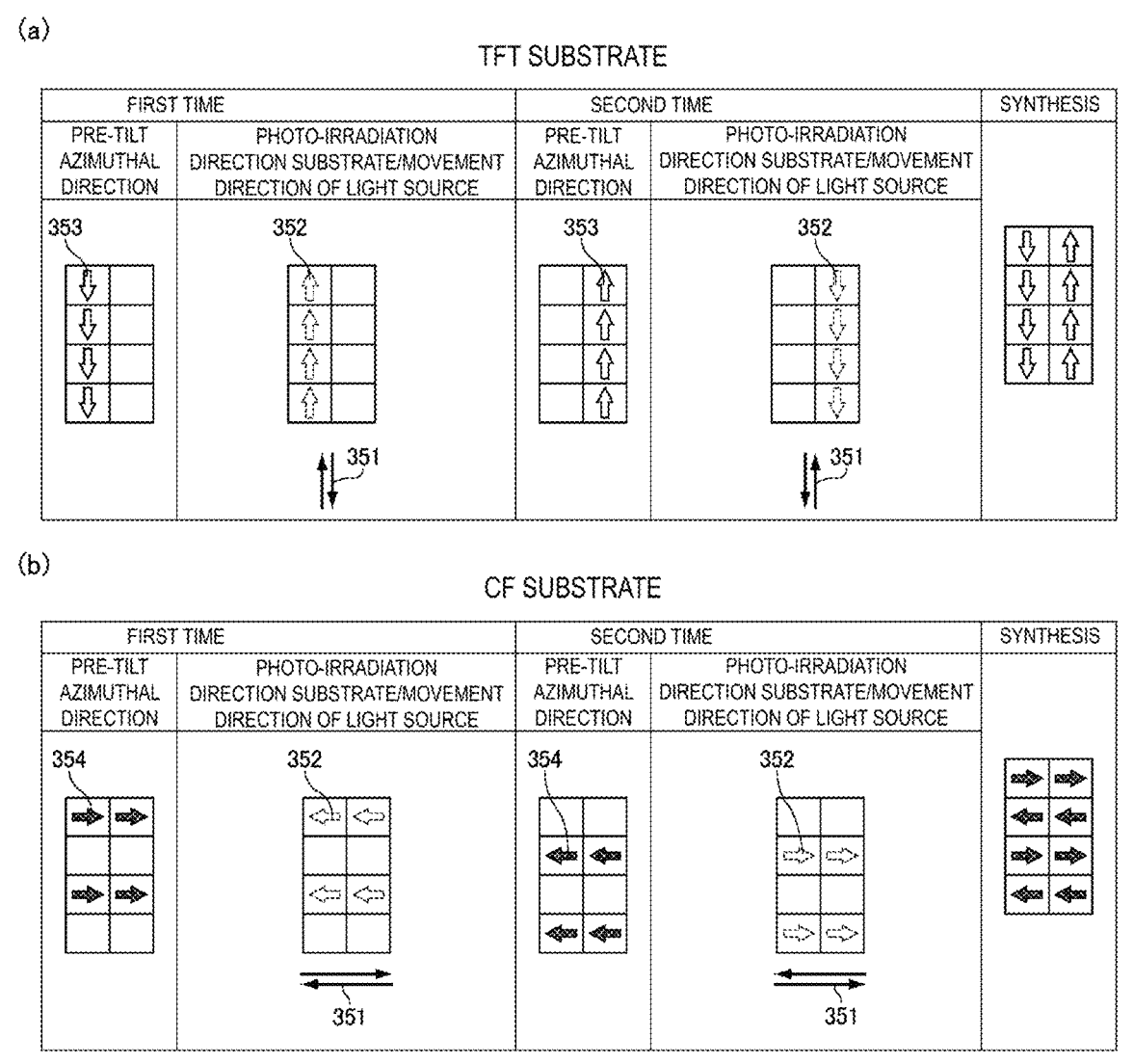

(a) of FIG. 22 is a view illustrating alignment process of the TFT substrate (first substrate) in Comparative Example 3, and (b) of FIG. 22 is a view illustrating alignment process of the CF substrate (second substrate) in Comparative Example 3. As illustrated in (a) of FIG. 22, first, a right half of one pixel was blocked from light, and a left half of the one pixel was subjected to the first photo-irradiation with a movement direction 351 of the TFT substrate or the light source as a vertical direction and a photo-irradiation direction 352 parallel to the movement direction 351 of the TFT substrate and the light source. Subsequently, the left half of the one pixel was blocked form light, and the right half of the one pixel was subjected to the second photo-irradiation with the movement direction 351 of the TFT substrate or the light source and the photo-irradiation direction 352 as the directions reverse to the first photo-irradiation. The CF substrate was subjected to alignment process in the following manner. As illustrated in (b) of FIG. 22, first, a lower half of each half pixel (a region obtained by dividing one pixel into two upper and lower parts) was blocked from light, and an upper half of each half pixel was subjected to the first photo-irradiation with the movement direction 351 of the CF substrate or the light source as a horizontal direction, and the photo-irradiation direction 352 parallel to the movement direction 351 of the TFT substrate or the light source. Subsequently, the upper half of each half pixel was blocked from light, and the lower half of each half pixel was subjected to the second photo-irradiation with the movement direction 351 of the TFT substrate or the light source and the photo-irradiation direction 352 as directions reverse to the first photo-irradiation.

Figure 23:
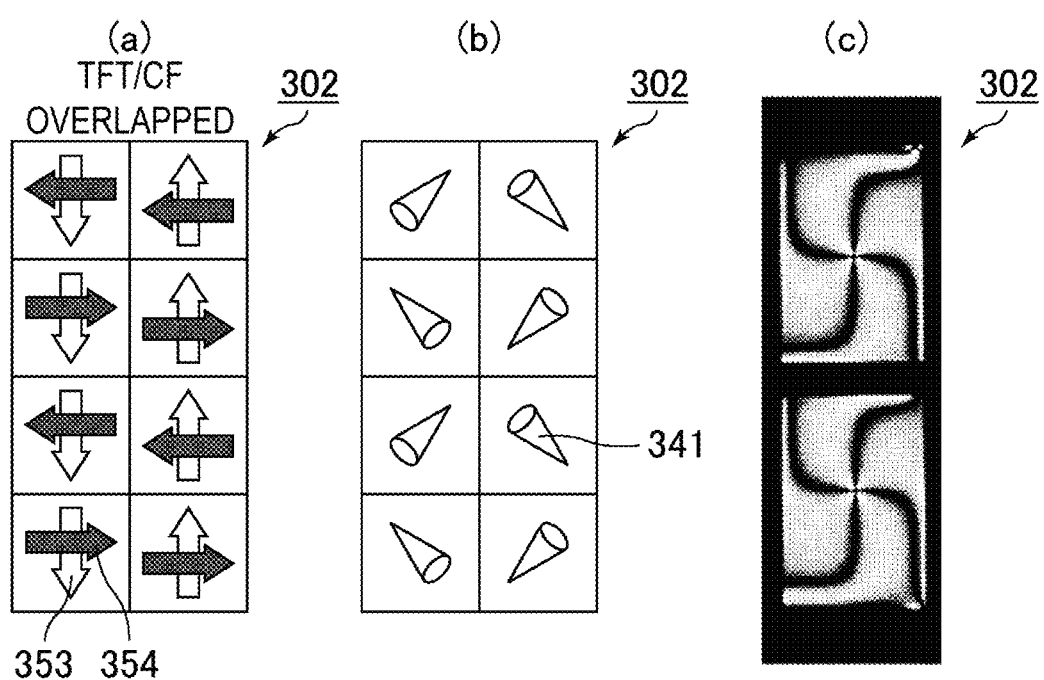
FIG. 23(a) is a view illustrating a state of alignment process in Comparative Example 3.
FIG. 23(b) is a schematic plan view illustrating tilt azimuthal directions of liquid crystal molecules in Comparative Example 3.
FIG. 23(c) is an enlarged picture of Comparative Example 3 at the time of voltage application.

Similarly in Example 1, the TFT substrate and the CF substrate that were subjected to alignment process described above were used to produce a liquid crystal cell 302 in Comparative Example 3. (a) of FIG. 23 is a view illustrating a state of alignment process in Comparative Example 3, (b) of FIG. 23 is a schematic plan view illustrating tilt azimuthal directions of liquid crystal molecules in Comparative Example 3, and (c) of FIG. 23 is an enlarged picture of Comparative Example 3 at the time of voltage application. (a) to (c) of FIG. 23 each illustrate one display unit of the liquid crystal cell 302 in Comparative Example 3. As illustrated in (a) of FIG. 23, when the TFT substrate and the CF substrate were attached to each other, in each alignment region, a pre-tilt azimuthal direction 353 with respect to the TFT substrate and a pre-tilt azimuthal direction 354 with respect to the CF substrate were orthogonal to each other. As illustrated in (b) of FIG. 23, in the known 4D-RTN mode, a half pixel was divided into four alignment regions. The tilt azimuthal directions of the liquid crystal molecules were different from one another in the alignment regions. In Comparative Example 3, as illustrated in (c) of FIG. 23, dark lines in a fylfot pattern were formed in each half pixel. The average tilt angle of the liquid crystal cell in Comparative Example 3 was 88.9°. From FIG. 16, the pre-tilt angle of the liquid crystal molecules with respect to the first vertical film and the second vertical film were both approximately 88°.

Evaluation 1
Comparison of Exposure Times

The exposure times in Examples 1 to 3 and Comparative Examples 1 and 2 were compared and collectively shown in Table 1 give below. As shown in Table 1, the liquid crystal display panels in Examples 1 to 3 could perform alignment process with a half of the exposure times in Comparative Examples 1 and 2 in which both the surfaces were subjected to exposure.

TABLE 1

| Exposure Times | Example 1 | Example 2 | Example 3 | Comparative Example 1 | Comparative Example 2 |
|---|---|---|---|---|---|
| TFT side | 4 | 4 | 0 | 4 | 4 |
| CF side | 0 | 0 | 4 | 4 | 4 |
| Total | 4 | 4 | 4 | 8 | 8 |

Evaluation 2
Comparison of Mode Efficiency

As the liquid crystal cells in Example 1 and Comparative Examples 1 to 3, liquid crystal cells in which pixel pitches were changed were produced. Luminance with voltage application and luminance without voltage application in each liquid crystal cell were measured by the following method. The pixel pitch corresponded to a longitudinal direction of one display unit. First, a liquid crystal cell was arranged between a pair of linear polarizers, and a backlight was arranged on a back surface of one of the linear polarizers. Subsequently, the pair of linear polarizers were arranged in crossed-Nicol alignment to have the polarization axes orthogonal to each other. While the backlight was in an ON state, a voltage of 7 V was applied between the pixel electrodes and the common electrodes. In this manner, the luminance with voltage application was measured. The pair of linear polarizers were rotated by an angle of 90°, and were arranged in parallel-Nicol alignment to have the polarization axes parallel to each other. While the backlight was in the ON state, a voltage was not applied between the pixel electrodes and the common electrodes. In this manner, the luminance without voltage application was measured. The luminance with voltage application and the luminance without voltage application were measured through use of a spectroradiometer (SR-UL2 available from TOPCON TECHNOHOUSE CORPORATION).

Figure 24:
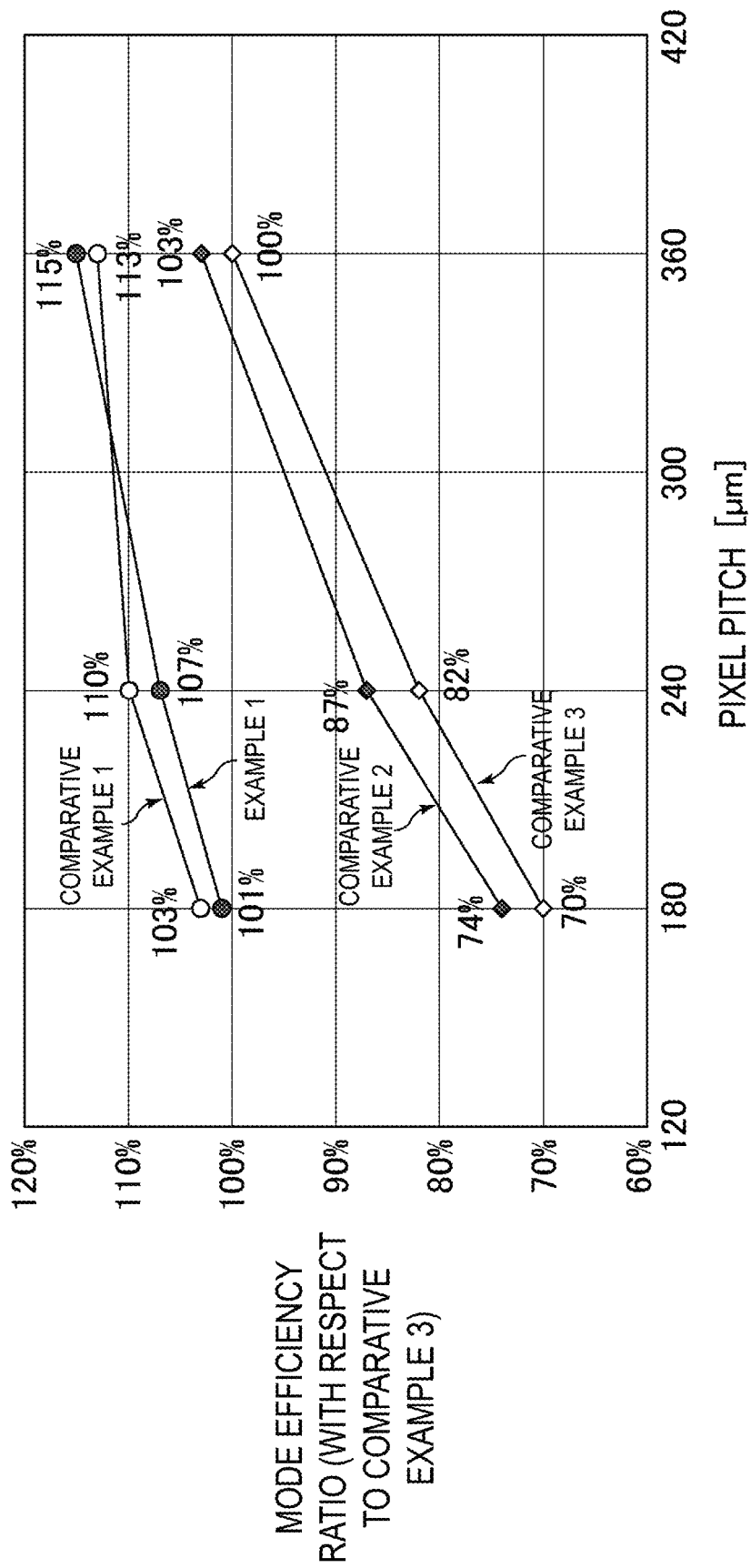
FIG. 24 is a graph showing a relationship between a pixel pitch and a mode efficiency ratio.

From a value of the luminance with voltage application and a value of the luminance without voltage application in each liquid crystal cell, which were obtained in the above-mentioned manner, mode efficiency of each liquid crystal cell was calculated by Equation (1) given below. The mode efficiency of Comparative Example 3 in which the pixel pitch was 360 μm was set to 100%, and a mode efficiency ratio of each liquid crystal cell was shown in FIG. 24. FIG. 24 is a graph showing a relationship between the pixel pitch and the mode efficiency ratio.

The mode efficiency=the luminance with voltage application/the luminance without voltage application     (1)

As shown in FIG. 24, the liquid crystal cell in Example 1 was largely improved in the mode efficiency ratio as compared to that in Comparative Example 3, and had the mode efficiency ratio exceeding 100% even when the pixel pitch was changed from 180 μm to 360 μm. When Example 1 and Comparative Example 1 were compared, it was found out that, even with Example 1 in which only the second vertical alignment film was subjected to alignment process, the mode efficiency equivalent to that in Comparative Example 1 in which both the first vertical alignment film and the second vertical alignment film were subjected to alignment process was obtained.

Evaluation 3

The mode efficiency ratios of Example 2, Comparative Example 2, and Comparative Example 3 were compared. In Comparative Example 2, alignment was performed on both the sides without providing slits to the pixel electrodes. In Comparative Example 3, the known eight-domain division was adopted. With regard to the mode efficiency ratios, the mode efficiency of Comparative Example 3 in which the pixel pitch was 360 μm was set to 100%. The results are shown in Table 2 given below. As shown in Table 2 given below, it was found out that the mode efficiency ratio was high in a case where the pixel pitch was particularly small. As described above, in Example 2, the slits were not provided to the pixel electrodes. Thus, luminance unevenness among the pixels due to variation of slit processing was not caused. Thus, even when the present embodiment is applied to a liquid crystal display panel with a large screen, display unevenness is less likely to be visually recognized. From the matters described above, it was found out that Example 2 was suitable for producing a liquid crystal display panel with a high resolution and a large screen.

TABLE 2

| Mode efficiency ratio (%) | | Example 2 | Comparative Example 2 | Comparative Example 3 |
|---|---|---|---|---|
| Pixel pitch | 180 μm | 85 | 74 | 70 |
| | 240 μm | 98 | 87 | 82 |

Evaluation 4
Comparison of Mode Efficiency

Figure 25:
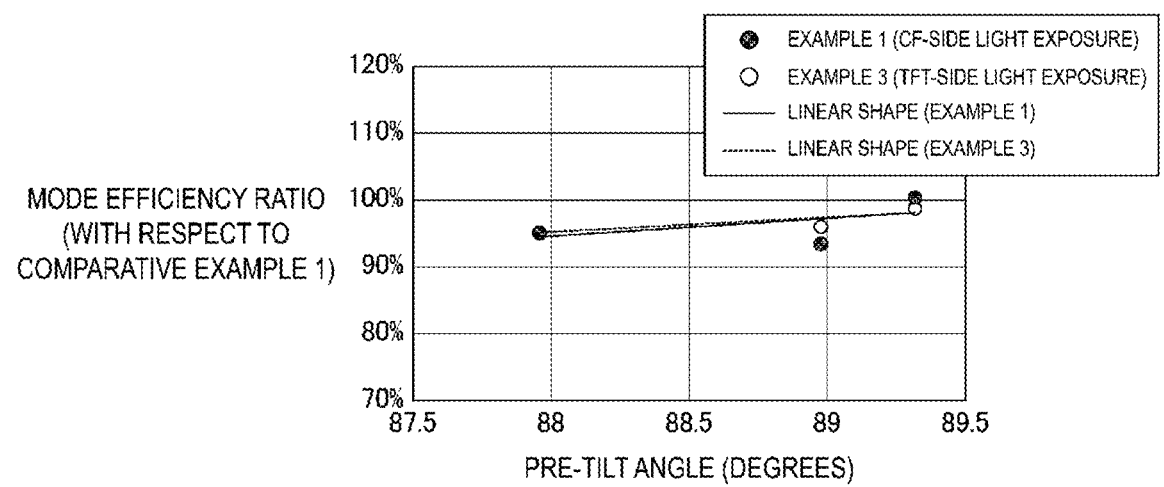
FIG. 25 is a graph showing a relationship between a pre-tilt angle and a mode efficiency ratio.

For the liquid crystal cells in Example 1 and Example 3, the pre-tilt angle was changed, and the mode efficiency was calculated by a method similar to that described above. The mode efficiency of Comparative Example 1 in which the actual measured value of the pre-tilt angle was 88.9° was set to 100%, and the mode efficiency ratio of each liquid crystal cell was shown in FIG. 25. FIG. 25 is a graph showing a relationship between the pre-tilt angle and the mode efficiency ratio. As shown in FIG. 25, there was no difference between the mode efficiency ratios of Example 1 and Example 3 even in a case where the pre-tilt angle was changed. From this point, it was found out that the mode efficiency ratio was not affected when any one of the vertical alignment film on the TFT substrate side and that on the CF substrate side was subjected to alignment process.

Evaluation on Response Speed

Figure 26:
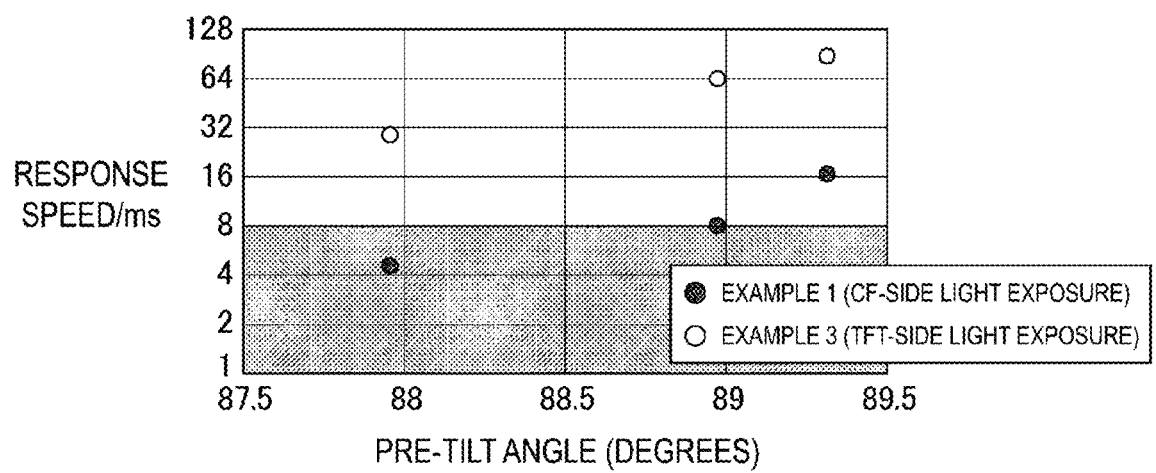
FIG. 26 is a graph showing a relationship between a pre-tilt angle and a response speed.

For the liquid crystal cells in Example 1 and Example 3, a response speed was measured by the following method. For the response speed, a response speed evaluation system, which was formed of a digital function generator (MJF1974 available from NF CORPORATION), a photosensor (photosensor amplifier C9329 available from Hamamatsu Photonics Co., Ltd), and an oscilloscope (TDS3034C-01 available from Tektronix, Inc.), was used. In the response speed evaluation system, first, the digital function generator output two freely-selected applied voltages to drive the liquid crystal cell. Subsequently, through use of the photosensor, a response from the liquid crystal molecules was detected and converted into a voltage signal. A response waveform between the voltages of the digital function generator and the photosensor was input to the oscilloscope and analyzed. In this manner, the response time of the liquid crystal molecules was measured. A time period required for transmittance or luminance of each liquid crystal cell to be changed from 10% to 90% was measured. In this manner, the response speed was calculated. The results are shown in FIG. 26. FIG. 26 is a graph showing a relationship between the pre-tilt angle and the response speed.

As shown in FIG. 26, at any pre-tilt angle, Example 1 had a response speed higher than that in Example 3. From this point, it was found out that higher response speed can be achieved when the vertical alignment film on the CF substrate side was subjected to alignment process as compared to the case where the vertical alignment film on the TFT substrate side was subjected to alignment process. Particularly, in Example 1, it was found that the configuration with the pre-tilt angle of 89° or less enabled the response speed to be 8 milliseconds being a guide value for 120 Hz drive, and was suitable for accelerating speed of the liquid crystal display panel.

Evaluation 5

Evaluation on Contrast

Through use of a liquid crystal simulator (LCDmaster available from SHINTEC Co., Ltd.), evaluation was performed on contrast of the liquid crystal cell having the configuration similar to that in Example 2. For the liquid crystal cell using solid electrodes without slits as both the pixel electrodes and the counter electrodes, only the second vertical alignment film formed on the CF substrate side was subjected to alignment process similarly in Example 2, and the pre-tilt angle was changed. Then, simulation was performed on the contrast (CR) change. The first vertical alignment film formed on the TFT side was not subjected to alignment process.

Figure 27:
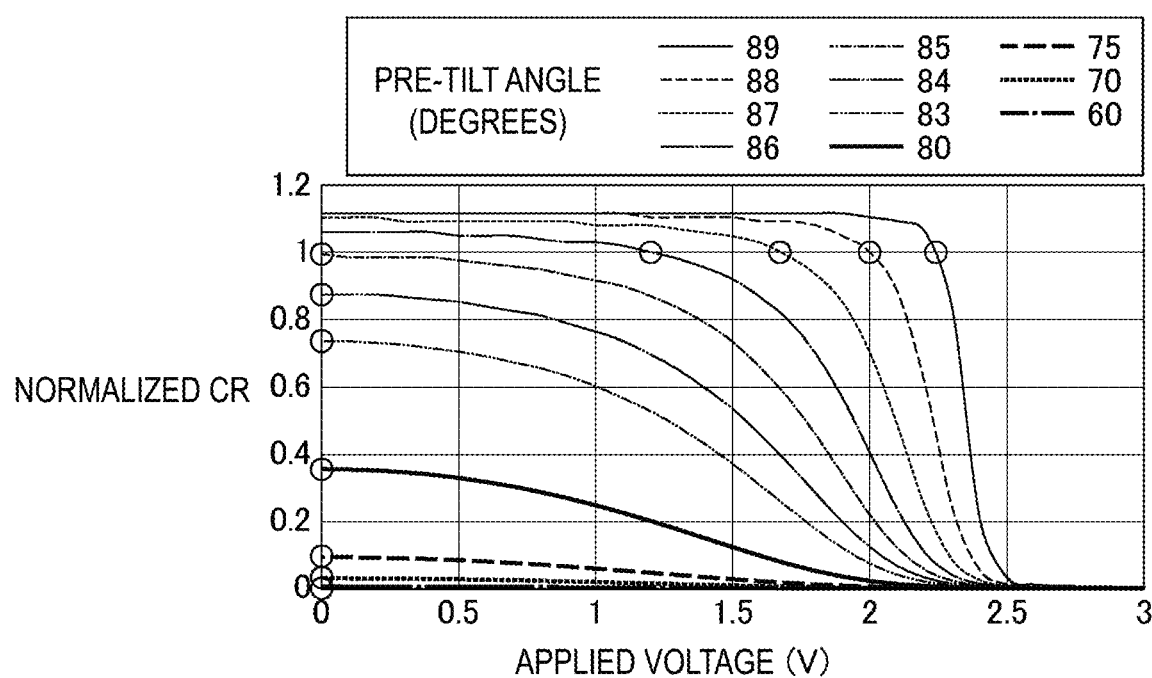
FIG. 27 is a graph showing a relationship between an applied voltage and normalized contrast.
Figure 28:
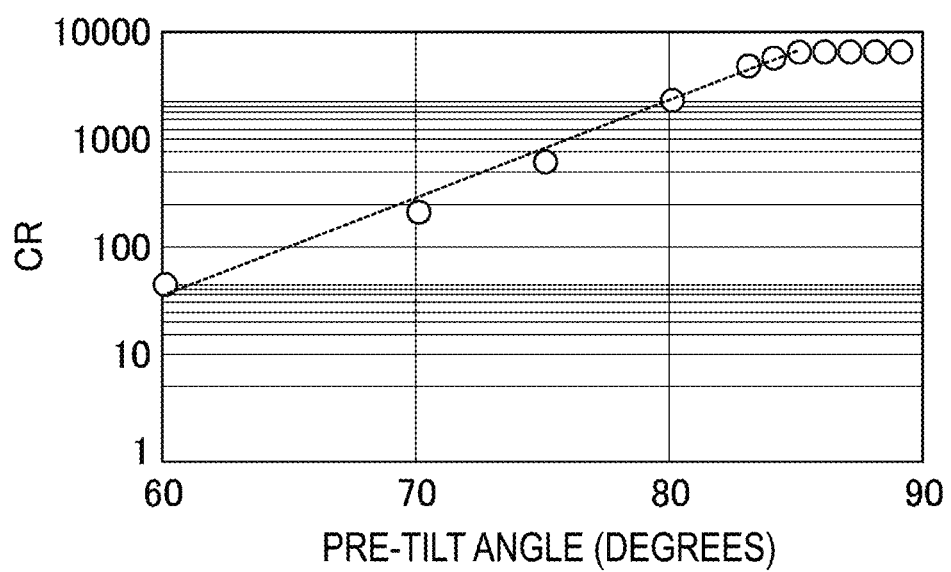
FIG. 28 is a graph showing a relationship between a pre-tilt angle and contrast.

The pre-tilt angle of the liquid crystal molecules adjacent to the second vertical alignment film was set to 88°, a CR value with an applied voltage of 2 V was set to 1 (normal value), and contrast with respect to the normal value was set to normalized contrast. With this, a relationship between the applied voltage and the normalized contrast was examined. The results are shown in FIG. 27. FIG. 27 is a graph showing a relationship between the applied voltage and the normalized contrast. Further, the CRs with the normalized CR of 1 and the CRs with the applied voltage of 0 V, which are surrounded by circles in FIG. 27, are plotted as shown in FIG. 28 with respect to the pre-tilt angle. FIG. 28 is a graph showing a relationship between the pre-tilt angle and the contrast. As shown in FIG. 28, in a case where the pre-tilt angle was between 89° and 85°, the CR was constant. In a case where the pre-tilt angle was 85° or less, a coefficient of determination R is $R^2=0.9892$. Thus, the CR was able to approximate an exponential function of $y=0.0001e^{0.2083x}$. The value "x" corresponds to the pre-tilt angle (°) of the liquid crystal molecules with respect to the vertical alignment film subjected to alignment process in a case where only one of the vertical alignment films is subjected to alignment process.

From FIG. 28, the following matters were found out. Specifically, in a case where the contrast of the liquid crystal display panel was set to 1000 or greater, the pre-tilt angle of the liquid crystal molecules with respect to the vertical alignment film subjected to alignment process was preferably 76° or greater. In a case where the contrast was 3000 or greater, the pre-tilt angle was further preferably 81° or greater. In a case where the contrast was set to 6700 being a constant value, the pre-tilt angle was further preferably 85° or greater.

Supplement

According to an aspect of the disclosure, a liquid crystal display panel includes, in the following order, a first substrate including a pixel electrode, a first vertical alignment film, a liquid crystal layer containing liquid crystal molecules, a second vertical alignment film, and a second substrate including a common electrode, wherein, when no voltage is applied to the liquid crystal layer, a first tilt angle of the liquid crystal molecules adjacent to the first vertical alignment film with respect to the first vertical alignment film and a second tilt angle of the liquid crystal molecules adjacent to the second vertical alignment film with respect to the second vertical alignment film differ from each other, in a case where the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, any one of the first vertical alignment film and the second vertical alignment film is a photo-alignment film subjected to alignment process such that a plurality of domains, the alignment vectors of which differ from each other, are formed in a region of a display unit, and the display unit includes, in the following order along a first direction of the display unit in a plan view, a first domain, a second domain, a third domain, and a fourth domain, the alignment vectors of which differ from each other, when a voltage is applied to the liquid crystal layer.

When no voltage is applied to the liquid crystal layer, a twist angle of the liquid crystal molecules between the first substrate and the second substrate may be 45° or less.

When no voltage is applied to the liquid crystal layer, a tilt angle of the liquid crystal molecules adjacent to a vertical alignment film that is subjected to the alignment process out of the first vertical alignment film and the second vertical alignment film may be 86° or greater and less than 90°.

When no voltage is applied to the liquid crystal layer, a difference between the first tilt angle and the second tilt angle may be 30° or less.

The pixel electrode may be provided with at least one slit.

The second vertical alignment film may be subjected to alignment process.

When a voltage is applied to the liquid crystal layer, the terminal points of the liquid crystal molecules in two domains adjacent to each other in one display unit may face with each other, and the alignment vectors of the two domains adjacent to each other may be parallel to each other.

When a voltage is applied to the liquid crystal layer, the terminal points of the liquid crystal molecules in two domains adjacent to each other in one display unit may face with each other, and the alignment vectors of the two domains adjacent to each other may be orthogonal to each other.

When a voltage is applied to the liquid crystal layer, the starting points of the liquid crystal molecules in two domains adjacent to each other in one display unit may face with each other, and the alignment vectors of the two domains adjacent to each other may be parallel to each other.

When a voltage is applied to the liquid crystal layer, the starting points of the liquid crystal molecules in two domains adjacent to each other in one display unit may face with each other, and the alignment vectors of the two domains adjacent to each other may be orthogonal to each other.

When a voltage is applied to the liquid crystal layer, the starting point of the liquid crystal molecules of one domain of two domains adjacent to each other in one display unit and the terminal point of the liquid crystal molecules of the other domain may face with each other.

According to another aspect of the disclosure, a liquid crystal display panel includes, in the following order, a first substrate including a pixel electrode, a first vertical alignment film, a liquid crystal layer containing liquid crystal molecules, a second vertical alignment film, and a second substrate including a common electrode, wherein, in a case where the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, any one of the first vertical alignment film and the second vertical alignment film is a photo-alignment film subjected to alignment process such that a plurality of domains, the alignment vectors of which differ from each other, are formed in a region of a display unit, the other one of the first vertical alignment film and the second vertical alignment film is not subjected to the alignment process, and the display unit includes, in the following order along a first direction of the display unit in a plan view, a first domain, a second domain, a third domain, and a fourth domain, the alignment vectors of which differ from each other, when a voltage is applied to the liquid crystal layer.

According to yet another aspect of the disclosure, a method for manufacturing the liquid crystal display panel according to the disclosure includes forming a vertical alignment film on any one of the first substrate and the second substrate, wherein, the forming a vertical alignment film is a step in which a coating film is formed by applying, on any one of the first substrate and the second substrate, an alignment film composition containing a material having a photo-alignment property, and alignment process is performed such that the coating film is irradiated with light from a light source, and the alignment process is performed at a plurality of scanning steps such that four alignment regions where exposure directions on the coating film differ from each other and form an angle of approximately 45° with respect to the first direction are formed along the first direction.

REFERENCE SIGNS LIST 10, 11, 12 Pixel (display unit)
10a First domain
10b Second domain
10c Third domain
10d Fourth domain
13 TFT
20 Back face-side polarizer
30 First substrate
31 Pixel electrode
32 Slit
40 Liquid crystal layer
41 Liquid crystal molecule
41S Starting point (tail of liquid crystal director)
41T Terminal point (head of liquid crystal director)
50 Second substrate (liquid crystal display panel substrate)
51 Counter electrode
60 Display surface-side polarizer
71 First vertical alignment film
72 Second vertical alignment film
80 Sealing member
100, 111, 113, 300, 301, 302 Liquid crystal display panel (liquid crystal cell)
110 Backlight
200 Photo-alignment processing device
220 Light source
221 Light
230 Polarizer
231 Polarization axis
232 Wire grid polarizer
233 Metal thin wire (wire grid)
235 Wavelength selection filter
240 Light blocking member
250 Stage
251, 351 Movement direction of substrate
252, 352 Photo-irradiation direction
253, 254 Light exposure direction
260 Rotation adjustment mechanism
264 Rotation mechanism
270 Lamp box
280 Photo-irradiation mechanism
353, 354 Light exposure direction
G1, G2 Gate signal line
S1, S2, S3, S4 Source signal line

The invention claimed is:

1. A method for manufacturing a liquid crystal display panel comprising, in the following order:
a first substrate including a pixel electrode provided with at least one slit;
a first vertical alignment film;
a liquid crystal layer containing liquid crystal molecules;
a second vertical alignment film; and
a second substrate including a common electrode, wherein
when no voltage is applied to the liquid crystal layer, a first tilt angle of the liquid crystal molecules adjacent to the first vertical alignment film with respect to the first vertical alignment film and second tilt angle of the liquid crystal molecules adjacent to the second vertical alignment film with respect to the second vertical alignment film are different from each other;
when the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, only one of the first vertical alignment film and the second vertical alignment film is a photo-alignment film that includes a plurality of domains with respective alignment vectors which differ from each other and which are formed in a region of a display unit; and
the display unit includes, in the following order along a first direction of the display unit in a plan view, a first domain, a second domain, a third domain, and a fourth domain, the alignment vectors of which differ from each other, when a voltage is applied to the liquid crystal layer;
the method, comprising:
forming a vertical alignments on any one of the first substrate and the second substrate;
wherein, the forming a vertical alignment film is a step in which a coating film is formed by applying, on any one of the first substrate and the second substrate, an alignment film composition containing a material having a photo-alignment property, and an alignment process is performed such that the coating film is irradiated with light from a light source;
the alignment process is performed at a plurality of scanning steps such that four alignment regions where exposure directions on the coating film differ from each other and form an angle of approximately 45" with respect to the first direction are formed along the first direction;
the coating film is irradiated with the light from the light source in a state where a polarizer is arranged between the light source and the coating film so that a polarization axis of the polarizer is approximately at an angle of 45" with respect to a photo-irradiation direction of the light from the light source;
wherein the alignment process comprises four light irradiating processes including:
(i) irradiating the first domain with the light;
(ii) irradiating the second domain with the light;

(iii) irradiating the third domain with the light; and
(iv) irradiating the fourth domain with the light;
the method further includes:
adjusting the direction of the polarization axis of the polarizer after each of the four irradiating processes; and
rotating any one of the first substrate or the second substrate by 180° after irradiating the second domain with the light.

2. The method for manufacturing the liquid crystal display panel according to claim 1,
wherein, in each of the four light irradiation processes, a direction of moving the any one of the first substrate or the second substrate and the photo-irradiation.

3. The method for manufacturing the liquid crystal display panel according to claim 1,
wherein the polarizer is a wire grit polarizer including a metal wire; and
the polarization axis of the polarizer and a direction in which the metal wire extends are orthogonal to each other.

4. The method for manufacturing the liquid crystal display panel according to claim 1,
wherein the coating film is irradiated with the light from the light source while moving the any one of the first substrate and the second substrate in a state where an angle between a direction of moving the any one of the first substrate and the second substrate and the photo-irradiation direction of the any one of the first substrate and the second substrate is 5" or less.

5. A method for manufacturing a liquid crystal display panel comprising, in the following order:
first substrate including a pixel electrode provided with at least one slit;
a first vertical alignment film;
a liquid crystal layer containing liquid crystal molecules;
a second vertical alignment film; and
a second substrate including a common electrode, wherein
when no voltage is applied to the liquid crystal layer, a first tilt angle of the liquid crystal molecules adjacent to the first vertical alignment film with respect to the first vertical alignment film and second tilt angle of the liquid crystal molecules adjacent to the second vertical alignment film with respect to the second vertical alignment film are different from each other;
when the liquid crystal display panel is seen in a plan view, and alignment vectors are defined such that an end closer to the first substrate in a long axis direction of the liquid crystal molecules is defined as a starting point and an end closer to the second substrate in the long axis direction of the liquid crystal molecules is defined as a terminal point, only one of the first vertical alignment film and the second vertical alignment film is a photo-alignment film that includes a plurality of domains with respective alignment vectors which differ from each other and which are formed in a region of a display unit; and
the display unit includes, in the following order along a first direction of the display unit in a plan view, a first domain, a second domain, a third domain, and a fourth domain, the alignment vectors of which differ from each other, when a voltage is applied to the liquid crystal layer;
the method, comprising:
forming a vertical alignments on any one of the first substrate and the second substrate;
wherein, the forming a vertical alignment film is a step in which a coating film is formed by applying, on any one of the first substrate and the second substrate, an alignment film composition containing a material having a photo-alignment property, and an alignment process is performed such that the coating film is irradiated with light from a light source;
the alignment process is performed at a plurality of scanning steps such that four alignment regions where exposure directions on the coating film differ from each other and form an angle of approximately 45" with respect to the first direction are formed along the first direction;
the coating film is irradiated with the light from the light source in a state where a polarizer is arranged between the light source and the coating film so that a polarization axis of the polarizer is approximately at an angle of 45" with respect to a photo-irradiation direction of the light from the light source;
wherein the alignment process comprises four light irradiating processes including:
(i) irradiating the first domain with the light;
(ii) irradiating the second domain with the light;
(iii) irradiating the third domain with the light; and
(iv) irradiating the fourth domain with the light;
the method further includes:
adjusting the direction of the polarization axis of the polarizer after each of the four irradiating processes; and
moving the polarizer and changing the photo-irradiation direction with respect to any one of the first substrate or the second substrate after irradiating the second domain with the light.

6. The method for manufacturing the liquid crystal display panel according to claim 5,
wherein in two of the four photo-irradiation processes, a direction of moving the any one of the first substrate or the second substrate and the photo-irradiation direction are different, and in the other two photoirradiation processes of the four photo-irradiation processes, the direction of moving the liquid crystal display panel and the photo-irradiation direction are the same.

7. The method for manufacturing the liquid crystal display panel according to claim 5,
wherein the polarizer is a wire grit polarizer including a metal wire; and
the polarization axis of the polarizer and a direction in which the metal wire extends are orthogonal to each other.

8. The method for manufacturing the liquid crystal display panel according to claim 5,
wherein the coating film is irradiated with the light from the light source while moving the any one of the first substrate and the second substrate in a state where an angle between a direction of moving the any one of the first substrate and the second substrate and the photo-irradiation direction of the any one of the first substrate and the second substrate is 5" or less.

* * * * *